United States Patent [19]
Batcher

[11] Patent Number: 4,727,474
[45] Date of Patent: Feb. 23, 1988

[54] STAGING MEMORY FOR MASSIVELY PARALLEL PROCESSOR

[75] Inventor: Kenneth E. Batcher, Stow, Ohio

[73] Assignee: Loral Corporation, Akron, Ohio

[21] Appl. No.: 468,028

[22] Filed: Feb. 18, 1983

[51] Int. Cl.⁴ .................................... G06F 15/62
[52] U.S. Cl. ................................................ 364/200
[58] Field of Search ... 364/200 MS File, 900 MS File, 364/514, 516, 518; 358/10, 11, 12; 340/750, 799, 801; 382/44–46

[56] References Cited

U.S. PATENT DOCUMENTS

| | | | |
|---|---|---|---|
| 3,800,289 | 3/1974 | Batcher | 364/200 |
| 3,810,112 | 5/1974 | Aho | 364/900 |
| 3,812,467 | 5/1974 | Batcher | 364/900 |
| 3,936,806 | 2/1976 | Batcher | 364/200 |
| 4,030,078 | 6/1977 | Klüge | 364/900 |
| 4,065,808 | 12/1977 | Schomberg | 364/200 |
| 4,161,036 | 7/1979 | Morris | 364/900 |
| 4,168,488 | 9/1979 | Evans | 340/799 |
| 4,236,228 | 11/1980 | Nagashima | 340/799 |
| 4,380,046 | 4/1983 | Frosch | 364/200 |
| 4,442,503 | 4/1984 | Schütt | 364/900 |

Primary Examiner—Raulfe B. Zache
Assistant Examiner—Florin Munteanu
Attorney, Agent, or Firm—P. E. Milliken; L. A. Germain; R. L. Weber

[57] ABSTRACT

The invention herein relates to a computer organization capable of rapidly processing extremely large volumes of data. A staging memory is provided having a main stager portion consisting of a large number of memory banks which are accessed in parallel to receive, store, and transfer data words simultaneous with each other. Substager portions interconnect with the main stager portion to match input and output data formats with the data format of the main stager portion. An address generator is coded for accessing the data banks for receiving or transferring the appropriate words. Input and output permutation networks arrange the lineal order of data into and out of the memory banks.

6 Claims, 24 Drawing Figures

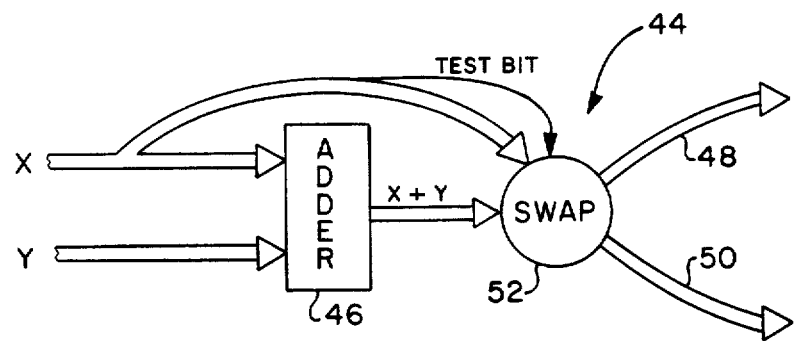
FIG.-4
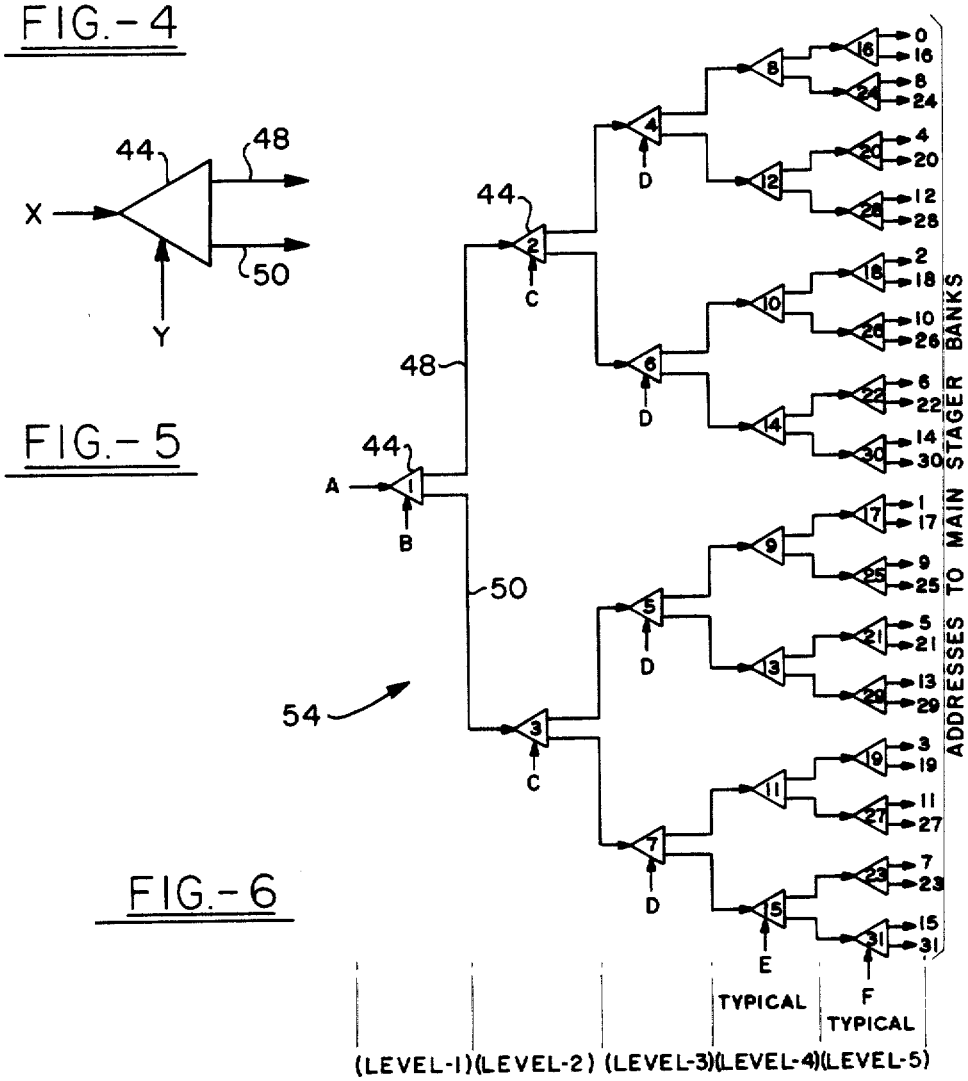
FIG.-5
FIG.-6

STAGING MEMORY FOR MASSIVELY PARALLEL PROCESSOR

The invention described herein was made in the performance of work under NASA Contract No. NAS 5-25942 and is subject to the provisions of Section 305 of the National Aeronautics & Space Act of 1958 (72 Stat. 435: 42 U.S.C. 2457).

TECHNICAL FIELD

The invention herein resides in the art of digital computer technology and, more particularly, relates to a staging memory for transferring large volumes of data between the processing array unit and a front-end computer.

BACKGROUND ART

The data processing requirements on digital computers have become increasingly large over the past number of years. To enhance processing time, conventional computers gave way to parallel processors. While parallel processors have provided for rapid processing times, the demands on even these state-of-the-art devices have required that data storage and processing capabilities be magnified.

By way of example, to monitor the position and movement of satellites, it has been determined that a digital processor handling up to 64 megabytes will be necessary. With such a large data capacity, the processing time must also be significantly rapid, with data transfer rates exceeding 20 megabytes per second. Of course, data transfer and processing will be substantially in the parallel mode.

Applicant is unaware of any existing technology, apart from that presented herein, which is capable of such operation. However, and by way of example, it is presented that applicant's prior U.S. Pat. Nos. 3,800,289, and 3,812,467, are of general interest by way of background to the concepts presented hereinafter.

The art still remains devoid of a digital computer organization capable of the large data handling requirements discussed directly above.

DISCLOSURE OF INVENTION

In light of the foregoing, it is an aspect of the instant invention to provide a staging memory for a massively parallel processor which is capable of transferring, manipulating, and processing large volumes of data on a rapid, reliable, and cost-effective basis.

This primary aspect of the invention is achieved by a computer organization, comprising: a host computer; a program and data management unit; a processing array unit; an array control unit interposed among said host computer, program and data management unit, and processing array unit; and a staging memory interconnected between said host computer, program and data management unit, and processing array unit.

BRIEF DESCRIPTION OF DRAWINGS

For a complete understanding of the objects, techniques and structure of the invention, reference should be had to the following detailed description and accompanying drawings, wherein:

FIG. 4 is a schematic circuit diagram of an adder-swap circuit;

FIG. 5 is illustrative of the symbol of an adder-swap circuit;

FIG. 6 is a schematic of a main address generator;

DETAILED DESCRIPTION OF PREFERRED EMBODIMENT

Figure 1:
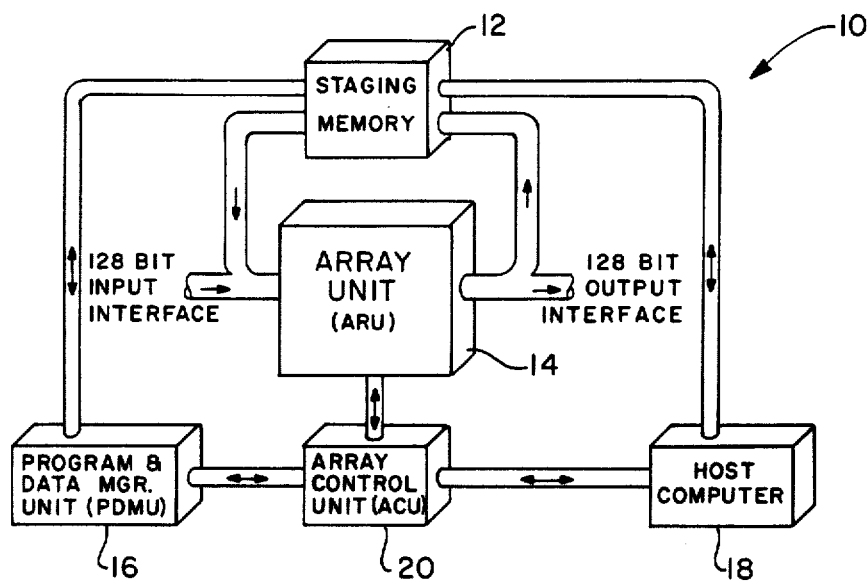
FIG. 1 is the block diagram of a massively parallel processor according to the invention.

Referring now to the drawings, and more particularly FIG. 1, it can be seen that a massively parallel processor (MPP) is designated by the numeral 10. A staging memory 12 is provided in the data path between an array unit (ARU) 14, the program and data management unit (PDMU) 16, and the host computer 18. The staging memory 12 has two basic functions: buffering arrays of data and reformatting arrays of data. The staging memory 12 accepts an array of data from the ARU 14, the host computer 18 or the PDMU 16. At the appropriate time it transmits the array, in a possibly different format, to the ARU 14, the host computer 18, or the PDMU 16. An array control unit (ACU) 20, interposed among the PDMU 16, host computer 18, and ARU 14 controls such data transfers.

The staging memory 12 may take a number of configurations. In the maximum configuration it can hold 64 megabytes of data and transfer data to and from the ARU 14 at a 160 megabytes per second rate. Input and output can occur simultaneously.

Figure 2:
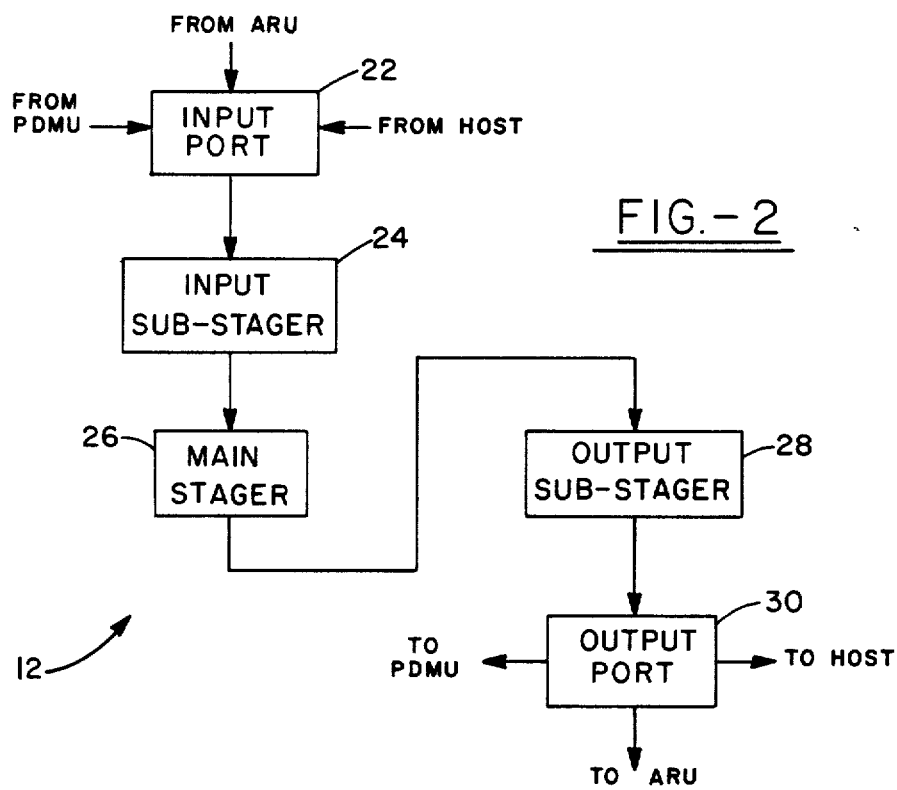
FIG. 2 is an illustration of the staging memory data path.

FIG. 2 shows the major parts of the staging memory 12 and the path of data through the parts. An input port 22 accepts data from one of three sources and passes the data to the input sub-stager 24. The input sub-stager reformats the data and passes the data to the main stager 26. The main stager holds the data until the designation is ready. It outputs data through the output sub-stager 28 and output port 30 to the destination as shown. This structure will be described in detail hereinafter.

MAIN STAGER

The main stager 26 is a large memory which holds the bulk of the data in the staging memory 12. In a preferred embodiment, it has N memory banks where N may equal 4, 8, 16, or 32. Each bank can support an input rate of 5 megabytes per second. Each bank contains 16K, 64K, or 256K words, all banks having the same capacity. Each memory word holds 64 bits of data plus 8 bits for error correction. Thus, the main stager 26 has 12 possible configurations. The maximum input and output rates match the I/O rates of the array unit (ARU) 14 in the MPP 10.

Figure 3:
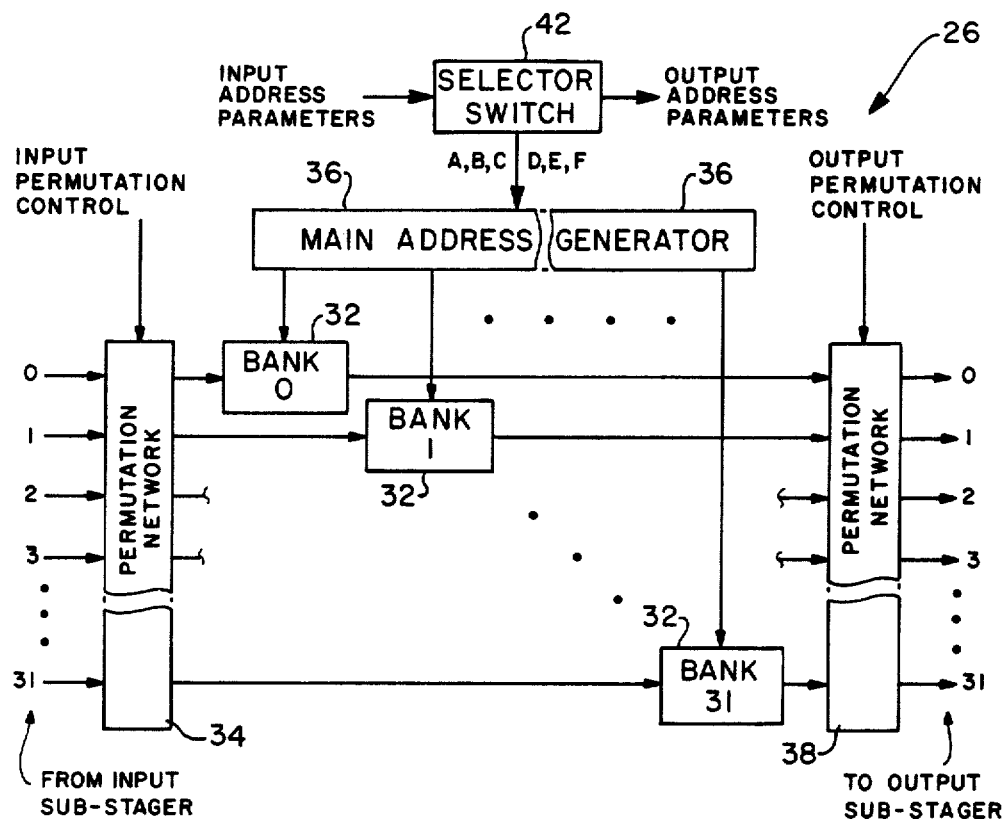
FIG. 3 is a block diagram of a 32 bank main stager.

FIG. 3 is a block diagram of a 32-bank main stager 26. The input sub-stager 24 supplies 32 items in parallel. The 32 items are fed to the memory banks 32 after being permuted in a permutation network 34. The banks 32 store the items at addresses generated by the main address generator 36. Items are fetched from the main stager 26 in a similar manner. The main address generator 36 supplies an address to each memory bank 32. The words at those addresses are read in parallel and sent to the output permutation network 38 where they are permuted and sent to the output sub-stager 28.

It will be understood that various sizes of staging memories can be devised utilizing the concepts of the invention herein. For N=16, only the even-numbered banks are populated and only the even-numbered items are transferred to and from the sub-stager. For N=8, only banks 0, 4, 8, 12, 16, 20, 24, and 28 are populated and only items 0, 4, 8, 12, 16, 20, 24, and 28 are transferred to and from the sub-stagers. For N=4, only banks 0, 8, 16, and 24 are populated and only items 0, 8, 16, and 24 are transferred to and from the sub-stagers. Except for the missing banks, the main stager operates like the 32-bank configurations.

The 32-bank main stager of FIG. 3 has $2^{19}$ words if each bank has 16K words, or $2^2$ words if each bank has 64K words or words if each bank has 256K words. The words have integer addresses in the range of 0 to $2^P-1$ where P=19, 21, or 23.

The addresses are distributed across the banks in interleaved fashion; for $0 \leq L \leq 31$, bank L stores all words whose addresses are congruent to L modulo 32. For example, bank 0 stores words 0, 32, 64, 96, ..., $2^P$-32. Bank 1 stores words 1, 33, 65, 97, ..., $2^P$-31. Bank 31 stores words 31, 63, 95, 127, ..., $2^P$-1.

Read and write operations transfer 32 words in parallel. The address parameters fed to the main address generator 36 through the selector switch determine which memory words are accessed. There are six address parameters labeled A, B, C, D, E, and F. The main address generator 40 generates 32 addresses (one for each word being transferred) from those parameters.

Word transfers are made according to the following rule: if $i_0, i_1, i_2, i_3$, and $i_4$, each equal 0 or 1, then Item $I = i_0 + 2i_1 + 4i_2 + 8i_3 + 16i_4$ on the sub-stager interface is transferred in or out of the main stager word at address: $A + Bi_0 + Ci_1 + Di_2 + Ei_3 + Fi_4$.

Certain constraints are placed on the address parameters: B is an odd integer; $C \equiv 2B$ modulo 32; $D \equiv 4B$ modulo 32; $E \equiv 8$ or 24 modulo 32; and $F \equiv 16$ modulo 32. These constraints ensure that the 32 words being accessed are in distinct memory banks. It should be understood that the statement X=Y modulo Z means that X and Y leave the same remainder when they are divided by Z.

If B is odd, C=2B, D=4B, E=8B, and F=16B, then item I is transferred in or out of address A+BI for $0 \leq I \leq 31$. The 32 addresses form an arithmetic progression from A to A+31B. This case is useful for accessing items in an M-dimensional array stored in the main stager.

For example, let Z be a 95×128 array of 64-bit items stored in main stager words 1000 through 13159; for $0 \leq g \leq 94$ and $0 \leq h \leq 127$, item Z9g,h) is stored in main stager word 1000+g+95h. To access (read or write) 32 items in row g of Z such as items $Z(g,h_0)$ through $Z(g,h_0+31)$ we set the address parameters as follows: $A = 1000 + g + 95h_0$; B=95; C=190; D=380; E=760 and F=1520. To access (read or write) 32 items in column h of Z such as items $Z(g_0,h)$ through $Z(g_0+31,h)$ we set the address parameters as follows: $A = 1000 + g_0 + 95h$; B=1; C=2; D=4; E=8; and F=16.

In other cases, the 32 main stager addresses do not form an arithmetic progression. These cases are useful for accessing certain sub-arrays of an M-dimensional array stored in the main stager.

For example, to access a 4×8 sub-array from the Z array of the previous example such as items Z(g,h) where $h_0 \leq h \leq h_0+7$ and $g=g_0, g_030 8, g_0+16$ and $g_0+24$ we set the address parameters as follows: $A = 1000 + g_0 + 95h_0$; B=95; C=190; D=380; E=8 and F=16.

When the main stager has only 16 banks (N=16) only the even-number banks are populated. The same addressing rule as for the N=32 case is used. Since the even-numbered banks store the words with even addresses, each word has an even address. Address parameter A must be an even integer and address parameter B has no effect (only even-numbered items are transferred on the sub-stager interfaces so $i_0=0$).

When the main stager has only 8 banks, only banks 0, 4, 8, 12, 16, 20, 24, and 28 are populated. Each word has an address divisible by 4. Address parameter A must be a multiple of 4 and parameters B and C have no effect.

When the main stager has only 4 banks, only banks 0, 8, 16 and 24 are populated Each word address is divisible by 8. Address parameter A must be a multiple of 8 and parameters B, C, and D have no effect.

MAIN ADDRESS GENERATOR

The main address generator 36 alternately receives the six address parameters for a write access and then the six address parameters for a read access through the selector switch 42. It alternately generates the 32 addresses for the write access and then the 32 addresses for the read access. The two accesses are completely independent; they just time-share the same hardware. The major cycle time is 1.6 microseconds with 800 nanoseconds used by the write access and 800 nanoseconds used by the read access.

As discussed above, the six address parameters are labeled A, B, C, D, E, and F. For $i_0,i_1,i_2,i_3,i_4$ in {0,1}, item $I = i_0 + 2i_1 + 4i_2 + 8i_3 + 16i_4$ on the sub-stager interface will be written into or read from main stager address $A + Bi_0 + Ci_1 + Di_2 + Ei_3 + Fi_4$.

Address parameter B is an odd integer; $C \equiv 2B$ modulo 32; $D \equiv 4B$ modulo 32; $E \equiv 8$ or 24 modulo 32 and $F \equiv 16$ modulo 32. Address $A + Bi_0 + Ci_1 + Di_2 + Ei_3 + Fi_4$ is in main stager bank $(A + Bi_0 + Ci_1 + Di_2 + Ei_3 + Fi_4)$ modulo 32. Besides generating the addresses, the main address generator 40 must also route them to the correct banks.

The main address generator 36 uses 31 adder-swap circuits. The schematic of an adder-swap circuit 44 is shown in FIG. 4. It receives two quantities, X and Y, and forms their sum X+Y in the adder 46. It outputs X and X+Y on two outputs. It tests a certain bit of X and if the bit is 0, then X is transmitted on the upper output 48 and X+Y on the lower output 50 of the swap circuit 52. If the test bit is 1, then X+Y is transmitted on the upper output 48 and X on the lower output 50. FIG. 5 depicts the symbol for the adder-swap circuit 44.

FIG. 6 shows the 31 adder-swap circuits 44 in a 5-level tree 54 comprising the main address generator 36. The X and Y inputs of the level 1 adder-swap circuit are address parameters A and B, respectively; the test-bit in this circuit is the least-significant bit of A. In level 2, the X inputs are the outputs of level 1 and the Y inputs equal address parameter C; the test-bit is the bit with weight 2 (next to the least-significant bit) of the X inputs. On levels 3, 4, and 5, the Y inputs are address parameters D, E, and F, respectively; the X inputs come from the previous level; and the test-bits are the bits with weight 4, 8, and 16, respectively, of the X inputs.

To appreciate how the main address generator 36 works, first observe that address parameter B is added to 16 addresses (those where $i_0=1$). From the constraints, parameter B is odd while C, D, E, and F are all even. Also, odd addresses must go to odd-numbered banks 32, and even addresses must go to even-numbered banks 32 by the modulo 32 distribution of addresses. The level 1 adder-swap circuit 44 sends out A and A+B on its outputs. The upper output is always even and the lower output is always odd. These out-puts feed the even-numbered and odd-numbered banks, respectively, so B is added to the correct 16 addresses.

In level 2, parameter C is added to the 16 addresses where $i_1=1$. From the constraints, C is an odd-multiple of 2 while D, E, and F are all even multiples of 2. The outputs of level 2 are swapped to ensure that their bits with weight 2 feed banks whose numbers have the same bits with weight 2.

Levels 3, 4, and 5 work with the bits of weight 4, 8, and 16, respectively.

It should now be seen that the main address generator computes 32 addresses with parameter A added to all of them. Parameters B, C, D, E, and F are added in all 32 combinations to form the correct set of 32 addresses. Each bank receives an address whose least-significant 5 bits equal its bank number so the main address generator routes the 32 addresses correctly.

If the main stager 26 has only 16 banks (N=16), then only 15 adder-swap circuits 44 are required; level 1 is eliminated and the lower halves of levels 2, 3, 4, and 5 are eliminated. If the main stager has only 8 banks (N=8) then only the 7 adder-swap circuits in the uppermost quarter of levels 3, 4, and 5 are needed. If the main stager has only 4 banks (N=4), then only adder-swap circuits 8, 16, and 24 are required.

PARTIAL READS AND WRITES

Sometimes the input sub-stager 24 may need to write less than 32 words into the main stager. This may occur at the end of a block or line of pixels, for instance, when the number of words to be written is not a multiple of 32. Thus, there is needed a mechanism to mask off certain banks at certain times. Also, the output sub-stager 28 may need to read less than 32 words from the main stager 26 at certain times. The output sub-stager can do its own masking in this case, but there is still needed a mechanism to turn off any error-checking in memory banks not read because these words may never have been written.

The main address generator described above is also used to generate enable bits for the memory banks 32. Each main stager bank gets an enble bit. If the enable bit is set to 1, then writing is enabled during a write access and error-checking is enabled during a read access As described earlier, the main address generator 36 is allowed 800 nanoseconds to generate and route the 32 addresses.

Four-bit-wide arithmetic is used in the adder-swap circuits 44 and a 100-nanosecond clock is used so the address parameters and addresses can be up to 32 bits long. The maximum length required for addresses is 23 bits (18 bits for the largest memory chips of 256K and 5 bits for the bank numbers). This leaves 9 bits which can be used for enable-bit computations. The nine-bit field occupies the most significant 9 bits of the 32-bit numbers.

Let $M_A$, $M_B$, $M_C$, $M_D$, $M_E$, and $M_F$ be the values in the 9-bit fields of parameters A, B, C, D, E, and F, respectively. If I is the number of an item on the sub-stager interface ($0 \leq I \leq 31$), then let M(I) be the 9-bit field computed by the main address generator which is fed to the bank accessed by item I. If $I=i_0+2i_1+4i_2+8i_3+16i_4$ where $i_0$ through $i_4$ are in $\{0,1\}$ then: $M(I) = M_A + i_0 M_B + i_1 M_C + i_2 M_D + i_3 M_E + i_4 M_F$. Assume that none of the address computations overflows into the 9-bit M fields. The main stager banks use the bit with weight 128 of the M(I) fields as an enable bit; the enable bit equals 1 if and only if $128 \leq M(I) \leq 255$ or $384 \leq M(I) \leq 511$. If $M_B=1$, $M_C=2$, $M_D=4$, $M_E=8$, and $M_F=16$, then $M(I)=M_A+I$. To enable writing or error checking on just the last J items on the sub-stager interface ($32-J \leq I \leq 31$) then, set $M_A=96+J$. To enable writing or error-checking on just the first J items on the sub-stager interface ($0 \leq I \leq J-1$) then, set $M_A=256-J$. Many other masking capabilities are possible by adjusting $M_A$ through $M_F$.

PERMUTATION NETWORKS

As shown in FIG. 3, the main stager has permutation networks 34,38 on its input and output data interfaces. During a write access the input network 34 routes each input word to the bank containing its address. During a read access the output network 38 arranges the words read from the main stager 26 into order.

As discussed above, item $I=i_0+2i_1+4i_2+8i_3+16i_4$ on the sub-stager interface communicates with bank $L(I) \equiv (A+Bi_0+Ci_1+Di_2+Ei_3+Fi_4)$ modulo 32, where A, B, C, D, E, and F are the address parameters. The constraints on the address parameters force B to be an odd integer, $C \equiv 2B$ modulo 32, $D \equiv 4B$ modulo 32, $E \equiv 8$ or 24 modulo 32 and $F \equiv 16$ modulo 32. Note that $16B \equiv 16$ modulo 32 for all odd B so $F \equiv 16B$ modulo 32. Also note that $8B \equiv 8$ or 24 modulo 32 for all odd B so $E \times 8B$ or $8B+16$ modulo 32. If $E \equiv 8B$ modulo 32 then $L(I) \equiv (A+BI)$ modulo 32. If $E \equiv 8B+16$ modulo 32, then $L(I) \equiv (A+BI+16i_3)$ modulo $32 \equiv (A+B(I+16i_3))$ modulo 32.

Figure 7:
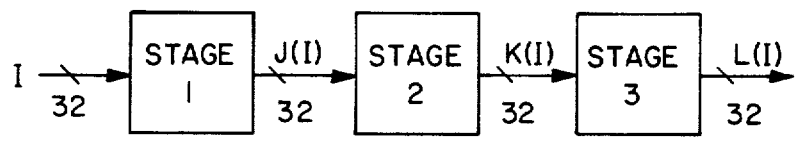
FIG. 7 is a schematic of an input permutation network.

The input permutation network 38 routes word I to bank L(I) for $0 \leq I \leq 31$. It does this in 3 stages as shown in FIG. 7. Stage 1 routes the 32 items from the input sub-stager to a set of 32 lines with item I going to line J(I) for $0 \leq I \leq 31$. Stage 2 routes J(I) to K(I) for $0 \leq I \leq 31$; Stage 3, K(I) to L(I) for $0 \leq I \leq 31$.

Stage 1 routes the items as follows. If E≡8B modulo 32, then J(I)=I for 0≦I≦31. If E≡8B+16 modulo 32, then J(I)=I for 0≦I≦7 and 16≦I≦23; J(I)=I+16 for 8≦I≦15; and J(I)=I-16 for 24≦I≦31. Note that when E≡8B+16 modulo 32, then J(I)≡I+16i₃ modulo 32. Regardless of the state of E, we have L(I)≡(A+BJ(I)) modulo 32.

Stage 3 routes the items as follows. For 0≦I≦31, L(I)≡(K(I)+A) modulo 32. This routing is an end-around shift of the 32 items A places modulo 32.

Figure 8:
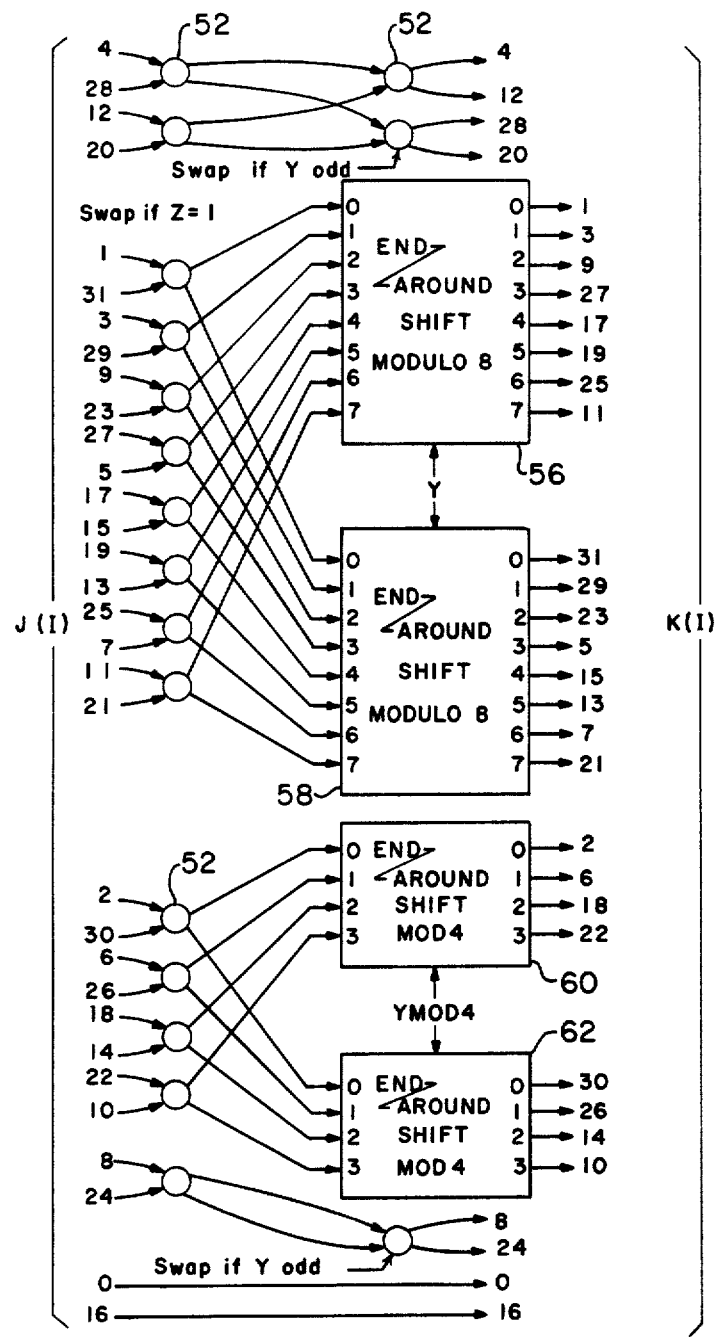
FIG. 8 is a schematic diagram of stage two of the input permutation network of FIG. 7.

Stage 2 routes the items as follows. For 0≦I≦31, K(I)=B.J(I) modulo 32. This will make L(I)≡A+B·J(I) modulo 32 which is the desired result. Stage 2 uses the fact that any odd integer B is equivalent modulo 32 to $(3)^y(-1)^z$ for some 0≦y≦7 and 0≦z≦1. Table I shows $(3)^y$ modulo 32 and $-(3)^y$ modulo 32 for 0≦y≦7. All odd integers from 1 to 31 are in this table. FIG. 8 shows stage 2 of the input permutation network. The first 15 swap circuits 52 interchange J(I) with 32-J(I) if z=1 (note that 16≡32-16 and 0≡32-0 modulo 32 so lines 0 and 16 do not need to be swapped).

If $J(I)≡(3)^a$ modulo 32 for some a then J(I) is sent to position a of a circuit which shifts the inputs y places modulo 8; J(I) will be routed to line $(3)^{a+y}$ modulo 32 of the K(I) output. Similarly, if $J(I)≡-(3)^a$ modulo 32 then J(I) is routed to input a of another circuit which shifts the inputs y places modulo 8; J(I) is routed to line $-(3)^{a+y}$ modulo 32 of the K(I) output. When J(I) is an odd multiple of 2 it is sent to an input of one or the other circuits which shift data (ymod4) places modulo 4. Swap circuits swap lines 4 and 12; 28 and 20; and 8 and 24 if y is odd. Lines 0 and 16 are routed directly to lines 0 and 16 of the K(I) outputs. As illustrated, the requisite shifts are accomplished by appropriate end-around shift circuits 56–62.

The output permutation network 38 is like the input permutation network 36 but with the data flowing in reverse order. Since 1600 nanoseconds are provided to transmit the 64-bit items through the networks, all transmission paths are 4 bits wide and 16 100-nanosecond clock times are used to clock the data.

MEMORY BANK

As discussed earlier, the staging memory 12 has N banks 32 of memory where N=4,8,16 or 32. The banks are identical. Each bank operates with a 100 nanosecond minor cycle time and a 16500 nanosecond major cycle time.

In each major cycle time a 64-bit input word is received from the input permutation network 34, 4 bits each minor cycle time (phase). During half the major cycle time, a 32-bit address is also received from the main address generator 40, 4 bits each minor cycle time. The 32-bit address comprises a 5-bit bank number which can be ignored, an 18-bit word address at which the input word is to be stored (if the memory chips hold only 64K bits then only 16 word address bits are used; if the memory chips hold only 16K bits, then only 14 address bits are used), and a 9-bit enable field whose next to most-significant bit is used to enable writing. The bank stores the 64-bit input word at the input address.

Simultaneously, each major cycle time, the bank 32 reads a 64-bit word from memory and presents it to the output permutation network 38, 4 bits each minor cycle time. The read address has the same format as the write address and is received from the main address generator 36 during the alternate half major cycle time, 4 bits at a time each minor cycle time.

Dynamic MOS random-access memory chips are preferably used to store the data. This technology gives the greatest number of bits per chip while being most cost-effective. It also requires the addition of refresh cycles and error correction.

Refreshing presents no major problem since there is provided 1600 nanoseconds to perform a write cycle, a read cycle, and a refresh cycle. A large number of 16K memory chips are presently available which can perform this and the speed requirement is loose enough so that 64K and 256K memory chips meeting this requirement will be available in the future. An 8-bit error-correction code (ECC) is added to each 64-bit data word. This allows single error correction and double error detection.

The ECC code is shown in Table II. Each of the 64 data bits hits a certain pattern of check bits as shown by the positions of the X's in the table. The check bits are labeled from $C_0$ through $C_7$ with $C_0$ on the left and $C_7$ on the right. When a word is stored in the memory bank the eight check bits are stored as well. For 0≦i≦7 check bit $C_i$ is the exclusive-OR of all data bits with an X in its column of Table II.

The code can correct single errors because each data bit has a unique code and each code has more than one X in it so no data bit error will look like a check bit error. The code can detect double errors because each code has an odd number of X's. A pair of data bit errors or a pair of check bit errors or a combination of a data bit error with a check bit error will generate an error syndrome with an even number of X's.

The code was selected for ease of implementation. For 0≦i≦15 and 0≦j≦3 let data bit 4i+j arrive on line j during minor clock cycle time (phase) i.

Note that the patterns for the first four check bits ($C_0$ through $C_3$) are simply the binary representation for the minor clock cycle time. Check bits $C_0$ through $C_3$ can be generated with four trigger flip-flops. During minor clock cycle time i, each check bit is complemented if an odd number of the four data bits (4i through 4i+3)=1 and if the corresponding bit of i=1.

The last three check bits ($C_5$, $C_6$, and $C_7$) have patterns independent of the minor clock cycle time, i. On each minor clock time, check bit $C_5$ is complemented if an odd number of data bits 4i, 4i+2, and 4i+3 equal 1; check bit $C_6$ is complemented if an odd number of data bits 4i, 4i+1, and 4i+3 equal 1; and check bit $C_7$ is complemented if an odd number of data bits 4i, 4i+1, and 4i+2 equal 1.

Check bit $C_4$ is selected to give an odd number of X's in each data bit pattern. On each minor clock time, i, check bit $C_4$ is comlemented if either (1) i has an even number of 1's and an odd number of data bits 4i+1, 4i+2, and 4i+3 equal 1; or (2) if i has an odd number of 1's and data bit 4i equals 1.

ADDRESS FLOW

Figure 9:
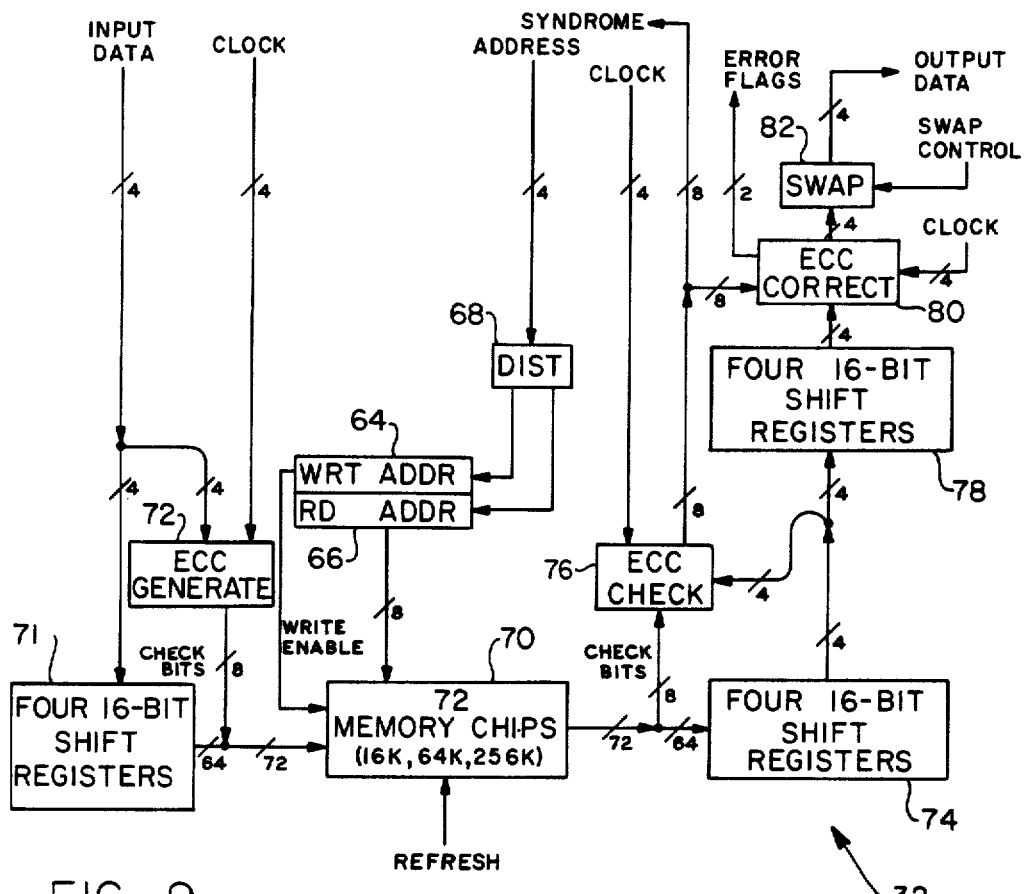
FIG. 9 is a schematic block diagram of the main stager bank.

Referring to FIG. 9, the schematic of a main stager bank may be seen. The write and read addresses arrive from the main address generator 36 on a 4-bit wide bus clocked every 100 nanoseconds. Eight clock cycles are used for the write address and then eight clock cycles are used for the read address. Only 19 bits are required from each 32-bit address; 18 bits for the chip address; and 1 enable bit as discussed above. The addresses are gathered in two registers, the write address register 64 and read address register 66. A switch 68 directs the address to the appropriate register.

At the appropriate time, an address is fed to the memory chips 70 over 9-bit-wide bus in two cycles (called RAS and CAS). If the chips store only 64K bits each then only 8 bits on the bus are used; and if the chips store only 16K bits each, then only 7 bits on the bus are used.

Figure 10:
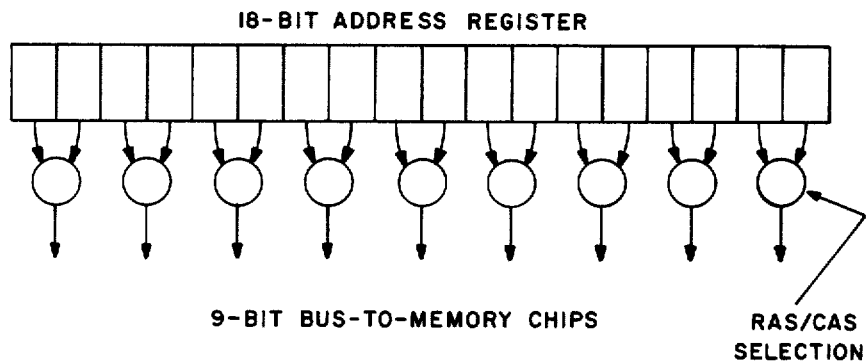
FIG. 10 is an illustration of the 9-bit bus to the memory chips.

FIG. 10 shows how the 9-bit RAS and CAS addresses are selected from the 18-bit address register. During the RAS cycle each of the nine 2-input selectors selects its left input and during the CAS cycle each selector selects its right input. If the memory chips store only 64K bits then the left-most bit of the 9-bit bus is ignored: only the right-most 16 bits of the address register are sent to the chips. If the memory chips store only 16K bits then the left-most pair of bits on the 9-bit bus are ignored: only the right-most 14 bits of the address register are sent to the chips. This arrangement minimizes the changes required to change the capacity of the memory chips.

As shown in FIG. 9, input data arrives from the input permutation network on a 4-bit wide bus clocked every 100 nanoseconds. The bits are gathered in four 16-bit shifter registers 70 for 16 clock times to accumulate the 64-bit data word.

The 4-bit wide input data bus also feeds the ECC generate circuit 72 along with the 4-bit clock counter. The ECC generate circuit generates 8 check bits as discussed above.

The 64-bit data word and the 8-bit ECC code are fed in parallel to the 72 memory chips 70 (one bit to each memory chip) during the write cycle. Writing is inhibited if the write enable bit is 0.

OUTPUT DATA FLOW

As shown in FIG. 9, output data is read in parallel from the 72 memory chips. The 64 data bits are loaded into four 16-bit shift registers 74 in parallel. The 8 check bits initialize trigger flip-flops in the ECC check circuit 76.

Sixteen minor clock cycle times (100 nanoseconds each) are taken to shift the data over a 4-bit wide bus to another set of four 16-bit shift registers 78. The 4-bit wide bus is fed to the ECC check circuit 76 along with a 4-bit clock counter. The ECC check circuit triggers its 8 flip-flops according to the ECC code described above.

At this time, the ECC check circuit 76 contains an 8-bit error syndrome which is fed to the ECC correct circuit 80. An all-zero syndrome indicates no errors in the data and check bits. A syndrome with a single-one indicates a check bit error. A syndrome with 3, 5, or 7 ones indicates a data bit error. A syndrome with 2, 4, 6, or 8 ones indicates a double error.

The 64 data bits are then fed from the second set of four 16-bit shift registers through the ECC correct circuit 80 and a swap circuit 82 to the output data bus. A single data bit error is corrected by complementing the bit in error as it goes through the ECC correct circuit. The swap circuit swaps the data bits in the inner pair when the swap control bit equals 1. The data bits in the outer pair are never swapped.

The ECC correct circuit 80 generates two error flags. One flag indicates the presence of a single check bit or data bit error (which was corrected). The other flag indicates the presence of a double error. If the ECC enable bit in the read address is 0 then the error flags are inhibited.

As can be seen from the foregoing, the main stager is a large, fast memory implemented from compact, economical dynamic MOS random access memory chips. The address generator and permutation networks allow a large variety of access modes; multi-dimensional arrays of data can be loaded in one direction and read out in another direction. The amount of hardware required for address generation and permutation is low relative to the hardware required to store the data.

SUB-STAGERS

The staging memory 12 contains two sub-stagers: one in the path between the staging memory input port and the main stager and another in the path between the main stager and the output port of the staging memory. Like the main stager 26, the sub-stagers 24,28 are memories with multiple access modes: data can be put into the sub-stagers in one direction and read out in a different direction.

The sub-stagers differ from the main stager in the following respects: each sub-stager can only hold 16K bytes instead of up to 64 megabytes; the word length of the sub-stagers is only 1 bit instead of 64 bits; fast ECL RAM chips are used instead of a dynamic MOS RAM's; and the multi-access capability is based on the logical exclusive-OR operation instead of arithmetic modulo 32.

The main reason for the sub-stagers is the requirement to match the input and output data formats on the staging memory ports to the format of main stager words. The main stager 26 allows fast access to sets of whole 64-bit words in a number of different modes. It does not allow access to parts of main stager words as access to parts of words would destroy the error correction capability. The sub-stagers with their 1-bit words allow data format changes on the microscopic level within 64-bit main stager words. The main stager allows data format changes on the microscopic level across sets of 64-bit main stager words.

Figure 11:
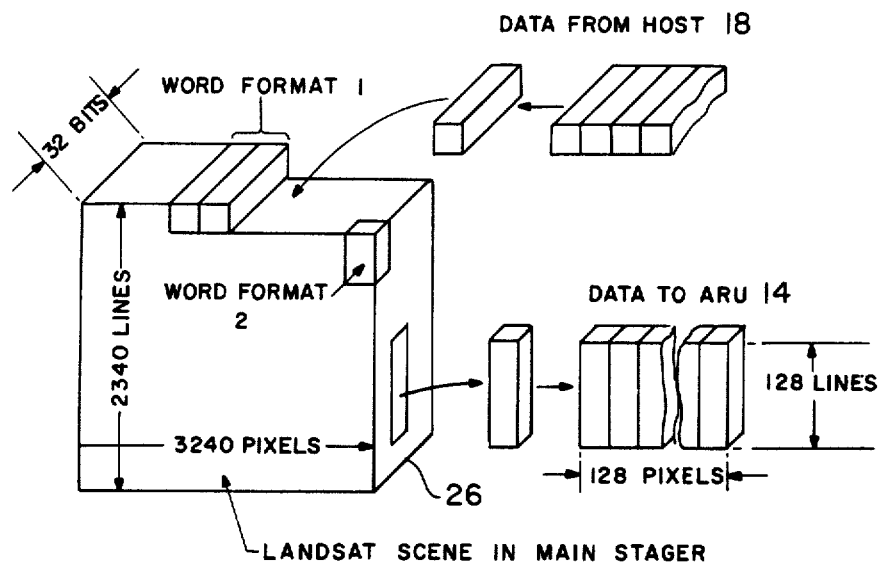
FIG. 11 is a block diagram of data transfer without sub-stagers.

To illustrate this requirement for the sub-stager, consider the example of sending a 2340-line by 3240-pixel LANDSAT scene from the host 18 to the MPP ARU 14. Each pixel has 32 bits (4 spectral bands with 8 bits per band). The host transmits the data pixel by pixel along each image line as shown in FIG. 11. The ARU reads a 128-line by 128-pixel sub-scene, column by column with each column containing one bit of one pixel from 128 different lines. The LANDSAT scene is stored in the main stager.

Several data formats of the 64-bit main stager words are available. One format is shown in FIG. 11 as word format 1. Since the host transmits the data pixel by pixel with 32 bits per pixel, two successive pixels are gathered together into one main stager word. The scene can be easily transmitted into the main stager. However, the ARU cannot read out the column of a sub-scene conveniently since the 128-bit column contains data from 128 different main stager words. If it read the 128 words and kept only 1 bit from each word, the output bandwidth is reduced by a factor of 64:1 (from 160 megabytes/sec to 2.5 megabytes/sec).

Another format is shown in FIG. 11 as word format 2. Since the ARU wants data in vertical columns 128 bits long, the LANDSAT scene is stored with each main stager word containing 1 bit of 1 pixel from 64 successive lines. Now the ARU can simply read two main stager words for each column. However, now the host cannot write into the main stager conveniently; the 32-bits in each pixel must be written into 32 different main stager words. Each stager word is written 64 different times and the input bandwidth is drastically reduced.

There are a number of other word formats, but none is particularly satisfactory. The basic problem is that the intersetion of the pixel input format with the column output format contains only one data bit. Regardless of word format, either the input or the output will only access one data bit at a time.

It is now apparent that the data on the input side or on the output side or on both sides need to be reformatted. If the data is reformatted in the host or in the ARU, the throughput rate is drastically reduced. Thus, there is desired a hardware device like a sub-stager on either or both sides which can reformat data at the desired 160 megabyte/sec rate.

If a sub-stager is provided on only one side (input or output), it will need a lot of capacity. Total capacity is reduced by interposing sub-stagers on both the input and output sides. To illustrate this, reconsider the example shown in FIG. 11.

With word format 1, no sub-stager is needed on the input side. With a sub-stager on the output side between the main stager and the ARU, the sub-stager would have to store 32-bit planes of data, because the words are 32-bits deep. The capacity required for the one output sub-stager is 64K bytes (doubled if the sub-stager is double-buffered).

Alterntively, with word format 2, no output sub-stager is required. Since main stager words are 64 lines long, there is a need to interpose an input stager between the host and the main stager large enough to hold 64 lines of data (1620K bytes). The sub-stager would be doubled if the input is double-buffered.

Figure 12:
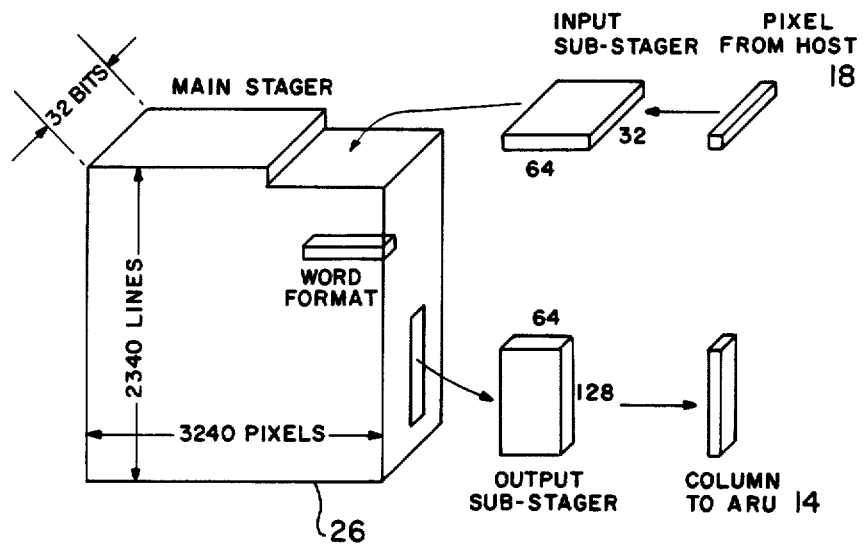
FIG. 12 is a block diagram of data transfer with two sub-stagers.

By interposing sub-stagers on both the input and output ports, a word format as shown in FIG. 12 may be employed. Each main stager word contains 1-bit from 64 successive pixels along one image line. The input sub-stager reads 64 pixels from the host and then writes 32 main stager words; its capacity need only be 256 bits (doubled if double-buffering is occurring). The output sub-stager reads 128 main stager words and then sends 64 columns of data to the ARU; its capacity need only be 1K bytes (doubled for double-buffering). The total sub-stager capacity required is only 1.25K bytes versus the 64K byte and 1620K byte requirements when only one sub-stager is used (all requirements are doubled if double-buffering occurs). Thus, the use of two sub-stagers is much preferred over the use of only one.

SUB-STAGER BLOCK DIAGRAM

Figure 13:
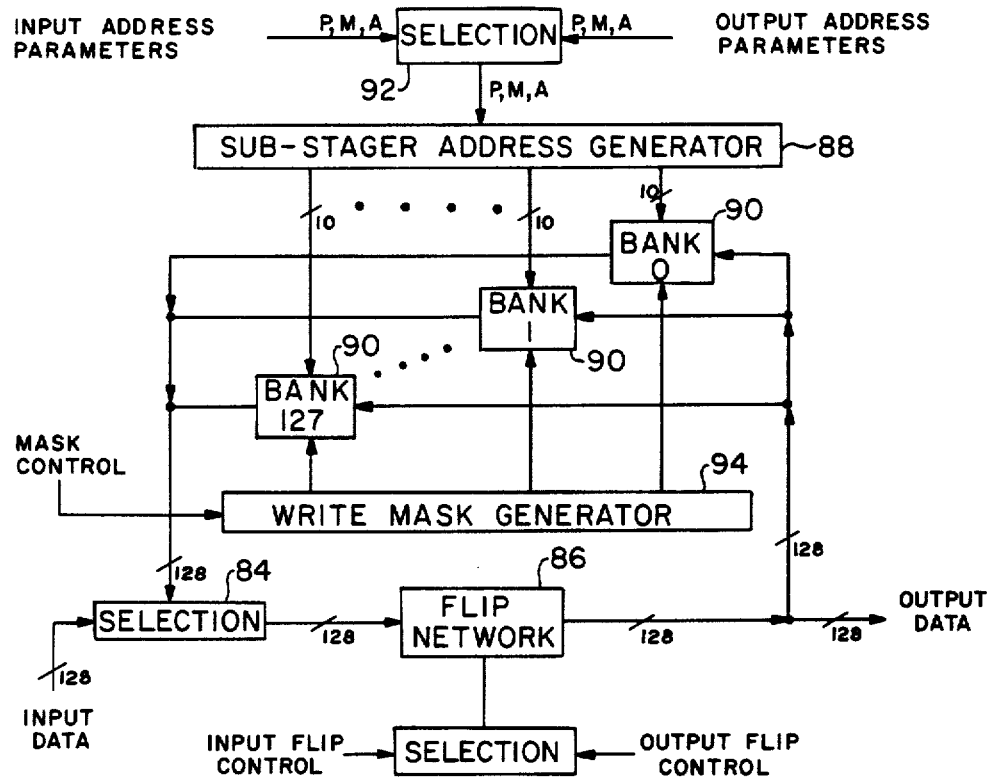
FIG. 13 is a block diagram of a sub-stager.

FIG. 13 shows a block diagram for a sub-stager. Each sub-stager has a 128-bit wide input data bus which is clocked at a 10 megahertz rate. For the input sub-stager 24, this bus is fed by the source of staging memory data (ARU 14 columns, host 18 data or DMU 16 data). For the output sub-stager 28, this bus is fed by the main stager 26 (4 bits from each of 32 main stager words).

Each sub-stager also has a 128-bit wide output data bus which is clocked at a 10 megahertz rate. For the input sub-stagers 24, this bus feeds the main stager 26 (4 bits for each of 32 main stager words). For the output sub-stagers 28, this bus feeds the output port 30 of the staging memory (ARU columns, host data or PDMU data).

Internally, the sub-stager hardware oscillates between a 50-nanosecond write cycle and a 50-nanosecond read cycle. During a write cycle the input data bus is sampled as at 84 and transmitted to the flip network 86 which permutes the bits on the 128-bit wide bus according to a 7-bit input flip control parameter. The permuted data bits are sent to the memory banks 90, one to each bank where they are stored at addresses arriving from the sub-stager address generator 88. The sub-stager address generator generates the 128 10-bit addresses from three input address parameters, P, M, and A gated as at 92. During a read cycle the address generator 88 generates addresses from three output address parameters. Each bank 90 outputs the state of the addressed bit in its bank. The bits are gathered together on a 128-bit wide bus and sent to the flip network 86 which permutes them according to a 7-bit output flip control parameter. The permuted bits are sent out on the 128-bit wide output data bus.

Each memory bank holds 1024 data bits so the capacity of a sub-stager is 16K bytes. Each bank is a high-speed ECL RAM chip with a capacity of 1024 bits. The sub-stager capacity is large enough to allow a wide variety of data reformatting in the staging memory.

SUB-STAGE ADDRESSING

Each of the 131,072 bits in a sub-stager is individually addressable with a 17-bit address. It is convenient to look at a sub-stager memory as an $8 \times 128 \times 128$ three-dimensional array. The 17-bit address for a data bit comprises a 3-bit page address, a 7-bit row address and a 7-bit column address.

The data bit in column C ($0 \leq C \leq 127$) and row R ($0 \leq R \leq 127$) on page P ($0 \leq P \leq 7$) is stored physically at address $128P + C$ in bank ($R \oplus C$). The 7-bit bank number ($R \oplus C$) is obtained by performing a bit-wise exclusive-OR operation between the corresponding bits of the 7-bit row number (R) and the 7-bit column number (C). In other words, if the bank number $B = b_0 + 2b_1 + 4b_2 + 8b_3 + 16b_4 + 32b_5 + 64b_6$, the row number $R = r_0 + 2r_1 + 4r_2 + 8r_3 + 16r_4 + 32r_5 + 64r_6$ and the column number $C = c_0 + 2c_1 + 4c_2 + 8c_3 + 16c_4 + 32c_5 + 64c_6$, where $b_i$, $r_i$, and $c_i$ are in $\{0,1\}$, then $b_i = r_i \oplus c_i$ for $0 \leq i \leq 7$. This storage rule is selected for fast sub-stager address generation. The sub-stager address generator must generate a set of addresses every 50 nanoseconds while the address generator in the main stager has 800 nanoseconds to generate its set of addresses.

A sub-stager memory is accessed by entering three address parameters; a 3-bit page address (P), a 7-bit access mode (M) and a 7-bit local address (A). Each access accesses 128 of the bits stored in the sub-stager memory; an input operation will write the 128-bits and an output operation will read the 128-bits. The page address, P, selects the page containing the accessed bits: all 128 of the accessed bits will be on page P. The access mode, M, selects the type of access. For example, if $M = 0$ then all 128 bits in one column of page P will be accessed, while if $M = 127$ then all 128 bits in one row of page P will be accessed. The local address, A, positions the access on page P. For example, if $M = 0$, then column A of page P is accessed, while if $M = 127$, then row A of page P is accessed.

Note that when $M = 0$, the vertical column access is moved horizontally over page P as the local address A is changed. When $M = 127$, the horizontal row access is moved vertically over page P as the local address A is changed. There are 126 other access modes besides the vertical column access and the horizontal row access. These are obtained by letting $1 \leq M \leq 126$. In general, these access modes select 128 data bits lying at the intersections of certain rows and columns of page P. Part of the local address, A, selects the rows and the remainder selects the columns.

To be specific, let the 7-bit access mode $M = M_o + 2M_1 + 4M_2 + 8M_3 + 16M_4 + 32M_5 + 64M_6$, and the 7-bit local address, $A = a_o + 2a_1 + 4a_2 + 8a_3 + 16a_4 + 32a_5 + 64a_6$; where $M_i$ and $a_i$ are in $\{0,1\}$ for $0 \leq i \leq 6$. Similarly, the 7-bit row and column numbers are defined in terms of their bits as before. Row R is selected if for all i where $M_i = 1$, we have $r_i = a_i$. Column C is selected if for all i where $M_i = 0$, we have $c = a_i$.

Let the access mode M contain n ones and 7-n zeros. Then n of the row number bits, $r_i$, equal the corresponding local address bits, $a_i$, leaving (7-n) row-number bits unspecified. A total of $2^{(7-n)}$ rows will be selected. They are found by letting the (7-n) unspecified row-number bits range through all $2^{(7-n)}$ combinations and fixing the n specified row-number bits to their corresponding local address bits. Similarly, (7-n) of the column-number bits, $c_i$, equal the corresponding local address bits, $a_i$, leaving n column-number bits unspecified. A total of $2^n$ columns are selected. They intersect at $2 = 128$ points and the data bits at these points on page P are accessed.

If $M = 0$, then $n = 0$, so 128 rows and one column are selected. If $M = 127$, then $n = 7$, so one row and 128 columns are selected. Table III shows 14 of the 128 possible access modes.

SUB-STAGER ADDRESS GENERATOR

As described above, the sub-stager memory is addressed as an $8 \times 128 \times 128$ three-dimensional array, each data bit having a 3-bit page address (P), a 7-bit row address (R), and a 7-bit column address (C). The data bit at (P,R,C) is physically stored at address $128P + C$ in bank $(R \oplus C)$.

The memory is accessed by entering 3 address parameters: A 3-bit address (P), a 7-bit access mode (M) and a 7-bit local address (A). Each access accesses 128 data bits. The accessed bits lie on page P at the intersection of certain selected rows and columns. Row R is selected if and only if $r_i = a_i$ for every i where $M_i = 1$. Column C is selected if and only if $c_i = a_i$ for every i where $M_i = 0$.

The 128 accessed data bits are numbered with a 7-bit number, $Z = z_o + 2z_i + 4z_2 + 8z_3 + 16z_4 + 32z_5 + 64z_6$, ranging from 0 to 127. Accessed data bit Z lies on page P at the intersection of row R and column C where for all $0 \leq i \leq 6$, $r_i = m_i a_i \vee \overline{m}_i z_i$ and $c_i = \overline{m}_i a_i \vee m_i z_i$. Note that where $M = 1$, the row address bit $r_i$ equals the local address bit $a_i$, so all data bits lie on the selected rows. Also, where $m_i = 0$, the column address bit $c_i$ equals the local address bit $a_i$, so all data bits lie in the selected columns. Because each $z_i$ contributes to a row address where $m_i = 1$ or to a column address where $m_i = 0$, but never to both addresses, each of the 128 values of Z are in a unique location and so these equations truly describe the locations of the 128 accessed data bits.

The physical location accessed data bit Z is at address $128P + C$ in bank $B = R \oplus C$. If $b_i$ is the $i^{th}$ bit in the bank number B, then $b_i = a_i \oplus z_i$ from the above equations. Thus, $B = Z \oplus Z$. Conversely, given a bank number B, we find $Z = A \oplus B$. Every bank contains an accessed data bit so the 128 accessed data bits can be accessed (read or written) in parallel.

The address of the accessed bit in bank number B is $128P + C$. For $0 \leq i \leq 6$, $c_i = \overline{m}_i a_i \vee m_i z_i$, and $z_i = z_i \oplus b_i$, so $c_i = z_i \oplus m_i b_i$.

Each bank has a ten-bit address input. The most-significant 3 bits of the address are simply the bits of the page address, P. The other 7-bits are the 7-bits of C given by the equation above. Consider any bank B. For $0 \leq i \leq 6$, if $b_i = 0$, then $c_i = a_i$, or if $b_i = 1$, then $c_i = a_i \oplus m_i$.

The sub-stager address generator drives a 17-bit bus which feeds all banks. The 10-bit address input of each bank is wired to 10 of the bits on the bus. Three of the bus bits are the bits of the page address, P; all banks are connected to these. Seven of the bus bits are the 7-bits of the local address, A; each of these bits drives 64 banks (bit $a_i$ is connected to all banks where $b_i = 0$). The other 7 bus bits are the 7-bits of $A \oplus M$; each of these bits drives 64 banks (bit $a_i \oplus m_i$ is connected to all banks where $b_i = 1$).

Figure 14:
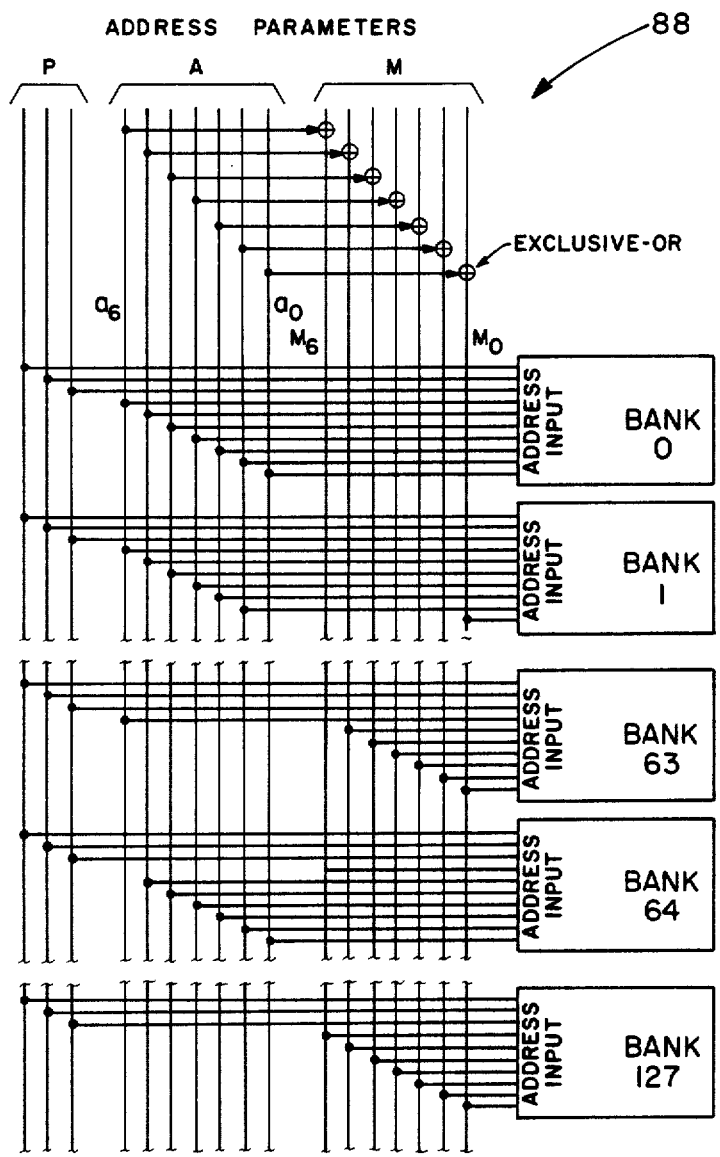
FIG. 14 is a schematic diagram of a sub-stager address generator.

FIG. 14 shows the sub-stager address generator and its connection to banks 0, 1, 63, 64, and 127. It only has 7 exclusive-OR circuits, much simpler than the 31 adder-swap circuits of the main address generator 36. It generates a set of 128 ten-bit addresses every 50 nanoseconds, where as the main address generator requires 800 nanoseconds to generate 32 addresses.

The sub-stagers 24,28 use the exclusive-OR operation to get multiple access modes because of its simplicity; the main stager 26 uses arithmetic modulo 32 because of its generality.

FLIP NETWORK

As discussed above, for $0 \leq Z \leq 127$, accessed data bit Z is stored in bank $B = A \oplus Z$, where A is the local address of the parameters for the access. When writing data into the sub-stager, each input data bit Z must be routed to sub-stager bank $A \oplus Z$. When reading data from the sub-stager the output of each bank B must be routed to output data bit $A \oplus B$. This is the function of the flip network 36 as shown in FIG. 13.

Note that if $B = A \oplus Z$, then $X = A \oplus B$, regardless if the flip network 36 is routing input data to the banks or routing bank outputs to the output data bus, the network always uses the local address, (A), of the access for control. The control is independent of the access mode (M) and the page address (P). Let the local address $A = a_o + 2a_1 + 4a_2 + 8a_3 + 16a_4 + 32a_5 + 64a_6$ where $a_i$ is in $\{0,1\}$ for $0 \leq i \leq 6$. The flip network operation is described as though it were routing bank output bits (B) to output data bits (a). Let $Z = z_o + 2z_i + 4z_2 + 8z_3 + 16z_4 + 32z_5 + 64z_6$ and $B = b_o + 2b_1 + 4b_2 + 8b_3 + 16b_4 + 32b_5 + 64b_6$, where $z_i$ and $b$ are in $\{0,1\}$ for $0 \leq i \leq 6$.

Figure 15:
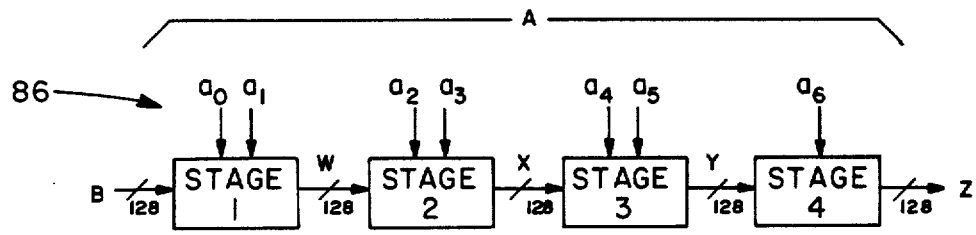
FIG. 15 is a block diagram of a flip network.

For $0 \leq B \leq 127$, the flip network routes bank output B to output data bit Z, where $z_i = a_i \oplus b_i$ for $023 i \leq 6$ and the local address equals A. The network has four stages, as shown in FIG. 15. The three internal 128-bit busses are labeled W, X, and Y, respectively. Stage 1 uses bits $a_o$ and $a_1$ for control, Stage 2 uses bits $a_2$ and $a_3$ for control, Stage 3 uses bits $a_4$ and $a_5$ for control, and Stage 4 uses bit $a_6$ for control.

For $0 \leq B \leq 127$, Stage 1 routes bank output b to internal bus line $W = w_o + 2w_1 + 4w_2 + 8w_3 + 16w_4 + 32w_5 + 64w_6$, where $w_i = a_i \oplus b_i$ for $i = 0,1$, and $w_i = b_i$ for $i = 2, 3, 4, 5, 6$.

Stage 1 comprises 32 circuits where each circuit routes 4 of the bank output bits (b) to 4W-bus lines.

For $0 \leq W \leq 127$, Stage 2 routes bit W of the W-bus to X-bus line $X = x_o + 2x_1 + 4x_2 + 8x_3 + 16x_4 + 32x_5 + 64x_6$, where $x_i = z_i \oplus w_i$ for $i = 2,3$. $X_i = w_i$ for $i = 0, 1, 4, 5, 6$.

Stage 2 is like Stage 1 with a different ordering of inputs and outputs and the use of $a_2$ and $a_3$ instead of $a_o$ and $a_i$.

For $0 \leq X \leq 127$, Stage 3 routes bit X of the X-bus to Y-bus line $Y = y_o + 2y_1 + 4y_2 + 8y_3 + 16y_4 + 32y_5 + 64y_6$, where $y_i = a_i \oplus x_i$ for $i = 4,5$; $y_i = x_i$ for $i = 0, 1, 2, 3, 6$.

Stage 3 looks like Stage 1 with a different control and ordering of input and outputs.

For $0 \leq Y \leq 127$, Stage 4 routes bit Y of the Y-bus to output data bit Z, where $z = a_o \oplus y_6$ and $z_i = y_i$ for $i = 0, 1, 2, 3, 4, 5$.

If $a_6 = 0$ then $Z = Y$ everywhere. If $a_6 = 1$ then $Z = Y + 64$ for $0 \leq Y \leq 63$ and $Z = Y - 64$ for $64 \leq Y \leq 127$. Stage 4 shifts the bits on the Y-bus by 64 places and end-around where $a_6 = 1$.

EFFECT OF A PARTIALLY-POPULATED MAIN STAGER

The main stager has N banks where $N = 4, 8, 16,$ or 32. It transfers N items at a time to and from the sub-stagers. Each item is transferred on 4 lines of the interface. For $0 \leq I \leq 31$, item I occupies lines $4I, 4I+1, 4I+2,$ and $4I+3$ of the sub-stager interface. When $N = 16$, then only even-numbered items are transferred. When $N = 8$, then only items with numbers divisible by 4 are transferred. When $N = 4$, then only items 0, 8, 16, and 24 are transferred.

The transfer rate of the sub-stagers to and from the main stager is proportional to N. It is desired to maintain a sub-stager capacity of 16K bytes and a burst transfer rate of 160 metabytes/sec to and from the ARU irrespective of N.

Let $Z = Z_o + 2Z_1 + 4Z_2 + 8Z_3 + 16Z_4 + 32Z_6$ be the index of any line on the sub-stager/main stager interface. If $N = 16$, then only 64 lines are active: those lines where $Z_2 = 0$. If $N = 8$, then only 32 lines are active, those lines where $Z_3 = Z_2 = 0$. If $N = 4$, then only 16 lines are active, those lines where $Z_4 = Z_3 = Z_2 = 0$.

INPUT SUB-STAGER

The input sub-stager 24 feeds the main stager 26 interface with 128 bits each 100 nanoseconds. If $N = 16$, then only half of these bits will actually be stored in the main stager, those bits on lines where $Z_2 = 0$. After sixteen 100 nanosecond cycles, all 64 bits of those main stager words will have been transferred. The sub-stager can then repeat the 16 cycles and route the other half of the data to the main stager. During the second set of 16 cycles, the input sub-stager address parameters repeat the same sequence as the first set of 16 cycles of the same data items that are read. The main stager address parameters are modified so the second half of the data is stored in different main stager words. Sub-stager control can easily repeat the sub-stager address parameters. To route the second half of the data, each data line where $Z_{2=1}$ must be routed to a line where $Z_2 = 0$. This is easily accomplished by complementing the $a_2$ control input to the flip network.

When $N = 8$, the input sub-stager can repeat each transfer four times, routing different data to the 32 active output lines each time. The active output lines are those where $Z = Z_2 = 0$. Routing is accomplished by complementing the $a_2$ flip control input during the second transfer, complementing the $a_3$ flip control input during the third transfer and complementing both flip control inputs during the fourth transfer.

When $N = 4$, the input sub-stager 24 repeats each transfer eight times. Flip control bits $a_4, a_3,$ and $a_2$ are combined with a logical exclusive-OR operation with the patterns 000, 001, 010, 011, 100, 101, 110 and 111, respectively on each transfer.

Thus, the addition of 3 exclusive-OR gates on flip control bits $a_4, a_3,$ and $a_2$ allows the input sub-stager to load the main stager when the main stager is partially populated.

OUTPUT SUB-STAGER

When the number of main stager banks $N < 32$ then only 4N input lines in the output sub-stager 28 are active. Just like the input sub-stager 24, each transfer can be repeated 32/N times to load the output sub-stager. Exclusive-OR gates are added to flip control bits $a_4, a_3,$ and $a_2$ to perform the routing. A write-mask generator is also added to the output sub-stager so only sub-stager banks fed by active input lines are enbled.

Let the number of main stager banks, $N = 4$. Each transfer is repeated 8 times. Let $T = t_o + 2t_1 + 4t_2$ be the repetition index, $0 \leq T \leq 7$. Since flip control bits $a_4, a_3,$ and $a_2$ no longer always equal the corresponding local address bits, they are denominated $a'_4, a'_3,$ and $a'_2$, respectively. Three exclusive-OR gates perform the following logic: $a'_4 = a_4 \oplus t_2$; $a'_3 = a_3 \oplus t_1$; and $a'_2 = a_2 \oplus t_o$.

The 16 active input lines are those where $Z_4 = Z_3 = Z_2 = 0$. The flip network will route these lines to the 16 sub-stager banks where $b_4 = a_4 = a_4 \oplus t_2$, $b_3 = a'_3 = a_3 \oplus t_1$ and $b_2 = a'_2 = a_2 \oplus t_o$. The write-enable inputs of the 128 sub-stager banks 90 can be driven from 8 write-mask lines via the write mask generator 94 of FIG. 13. For $0 \leq U = \mu_o + 2\mu_1 + 4\mu_2 \leq 7$, write-mask line U drives the write-enable bits for the 16 sub-stager banks where $b_4 = \mu_2$, $b_3 = \mu_1$ and $b_2 = \mu_o$. During transfer repetition T, only write-mask line U is enabled where $\mu_2 = a_4 \oplus t_2$, $\mu_1 = a_3 \oplus t_1$ and $\mu_o = a_2 \oplus t_o$. This enables those 16 banks fed by active input lines and disables writing in those banks fed by inactive input lines.

When the number of main-stager banks, $N = 8$, there are 32 active input lines. Each transfer is repeated four times with $T = 0, 1, 2,$ and 3, respectively. The $t_2$ bit of T is always 0 so $a'_4 = a_4$ always. During transfer repetition T, two write-mask lines are enabled, U and $U + 4$ where $\mu_2 = 0$, $\mu_1 = a_3 \oplus t_1$ and $\mu_o = a_2 \oplus t_o$.

When the number of main stager banks, $N = 16$, there are 64 active input lines and each transfer is repeated twice with $T = 0$ and 1, respectively. Bits $t_1$ and $t_2$ of T are always 0. During repetition time T, we enable four write mask lines: U, $U + 2$, $U + 4$, and $U + 6$; where $\mu_2 = \mu_1 = 0$ and $\mu_o = a_2 \oplus t_o$.

When the number of main stager banks, $N = 32$ then all 8 write-mask lines are enabled every time.

INPUT AND OUTPUT PORTS

Figure 16:
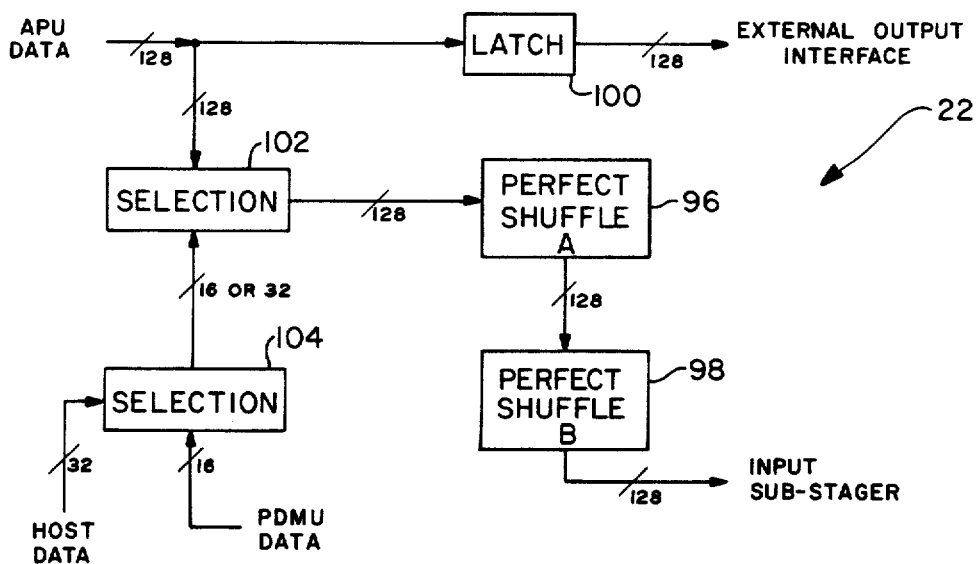
FIG. 16 is a block diagram of an input port.

As shown in FIG. 2, the staging memory 12 has an input port 22 and an output port 30. The input port receives data from the ARU 14, the host computer 18 interface or from the PDMU 16 interface. It transmits the data to the input sub-stager 24. As a secondary function, the input port can transfer ARU data to the 128-bit-wide external output interface of the MPP. It can perform this secondary function while host or PDMU data is being transferred to the input sub-stager. Data rates on the ARU port, the external output port and the input sub-stager port can be as high as 160 megabytes/sec. Data rates on the host and PDMU ports will normally be limited by the interfaces of these units. FIG. 16 is a block diagram of the input port 22. The components of the input port are described below.

Figure 17:
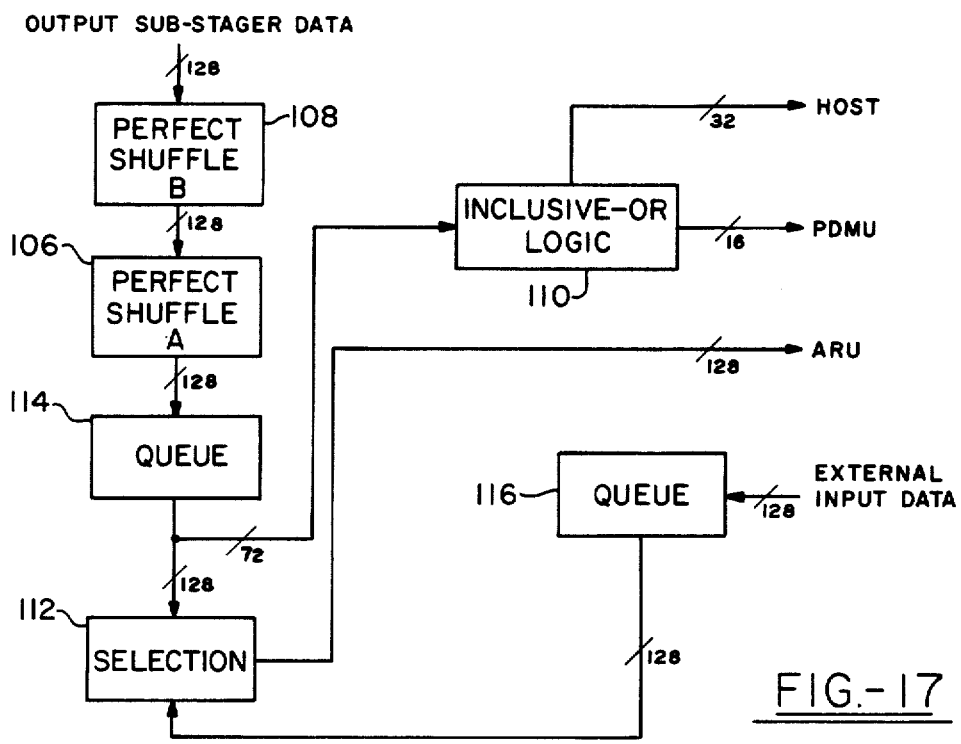
FIG. 17 is a block diagram of an output port.

The output port 30 has the reverse role. It receives data from the output sub-stager 28. It transmits the data to the ARU, to the host computer interface or to the PDMU interface. As a secondary function the output port can transfer data from the 128-bit-wide external input interface of the MPP to the ARU. It can perform this secondary function while output sub-stager data is being transferred to the host or PDMU. Data rates on the ARU port, the external input port, and the output sub-stager port can be as high as 160 megabytes/second. FIG. 17 is a block diagram of the output port 30. The components of the output port are described below.

INPUT PORT

As shown in FIG. 16, the input port 22 comprises two perfect shuffle networks 96,98, a latch 100 and selection gates 102,104.

PERFECT SHUFFLE A

The perfect shuffle A network 96 accepts data from one of the three sources shown on a 128-bit-wide bus, permutes the data in certain ways and presents the data to the perfect shuffle B network 98 on a 128-bit-wide bus. It uses two control bits to select one of four permutations.

The first permutation is simply the identity permutation. For $0 \leq I \leq 127$, the data bit on input line I is transferred to output line I.

The second permutation divides the input data into eight groups with 16 bits in each group. The bits within each group are shuffled just like the riffle shuffle of a deck of 16 playing cards. The groups are then packed together and sent out to the perfect shuffle B network 98. For $0 \leq I \leq 15$ and $0 \leq J \leq 7$, the data bit on input line $16J + I$ is transferred to output line K where:

$K = 16J + 2I$ for $I = 0, 1, \ldots, 7$; and
$K = 16J + 2I - 15$ for $I = 8, 9, \ldots, 15$.

The third permutation is equivalent to performing the second permutation two times. For $0 \leq I \leq 15$ and $0 \leq J \leq 7$, the data bit on the input line $16J + I$ is transferred to output line K where:

$K = 16J + 4I$ for $I = 0, 1, 2, 3$;
$K = 16J + 4I - 15$ for $I = 4, 5, 6, 7$;
$K = 16J + 4I - 30$ for $I = 8, 9, 10, 11$; and
$K = 16J + 4I - 45$ for $I = 12, 13, 14, 15$.

The fourth permutation is equivalent in performing the second permutation three times. It is also the inverse of the second permutation. For $0 \leq I \leq 15$ and $0 \leq J \leq 7$, the data bit on input line $16J + I$ is transferred in output line K where:

$K = 16J + I/2$ for even I; and
$K = 16J + (I + 15)/2$ for odd I.

Figure 18:
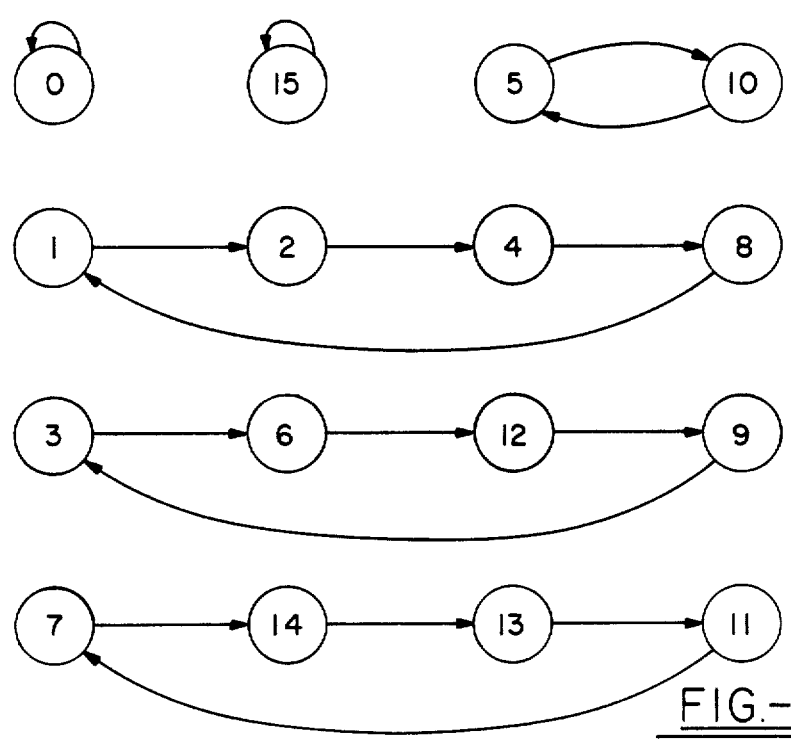
FIG. 18 is a flow diagram of a perfect shuffle A.

FIG. 18 is a flow diagram of the perfect shuffle A permutations. It only considers the first group of 16 lines; the other groups have similar diagrams Each of the 16 lines in the group has a circle in the diagram containing its index.

To read the diagram, consider any input line I for $0 \leq I \leq 15$ and find the circle containing I. Follow the arrow leaving circle I and call its destination circle K. K may or may not equal I. When the second permutation is performed in the perfect shuffle A network, the data bit on input line I is transferred to output line K.

The third permutation is equivalent to the second permutation performed twice. One can read this on the flow diagram by following two arrows: one from an initial circle I to a circle J and then from circle J to a destination circle K. The fourth permutation is equivalent to the second permutation performed three times. One can read this on the flow diagram by following three arrows from an initial circle I to a destination circle K. The first permutation is the identity so that destination circle equals the initial circle.

In FIG. 18, circles 0 and 15 have periods of one, circles 5 and 10 have periods of two and the other 12 circles have periods of four. The period is the minimum number of arrows to be traversed to get back to the starting point. The implementation of the perfect shuffle A network 96 uses this fact. Input lines 1, 2, 4, and 8 are fed to a four-place end-around shifter which shifts the data bits 0, 1, 2, or 3 places to perform the first, second, third or fourth permutations, respectively. The output of the shifter is connected to output lines 1, 2, 4, and 8. Similarly, other shifters handle the other lines with periods of four. Lines with periods of two are handled in swap circuits and lines with periods of one bypass the network.

PERFECT SHUFFLE B

The perfect shuffle B network 98 is like the perfect shuffle A network 96 except with a different grouping of the 128 lines into eight groups. Four groups contains the even-indexed lines and four groups contain the odd-indexed lines. For $0 \leq J \leq 3$, one group contains lines $32J, 32J + 2, 32J + 4, \ldots, 32J + 30$ and another group contains lines $32J + 1, 32J + 3, 32J + 5, \ldots, 32J + 31$.

Figure 19:
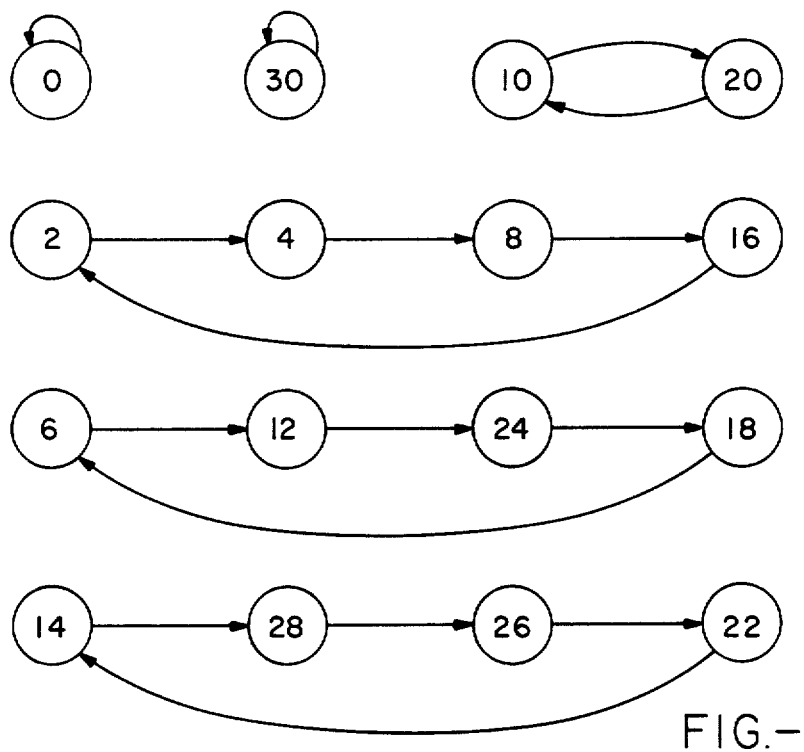
FIG. 19 is a flow diagram of a perfect shuffle B.

FIG. 19 shows the flow diagram for the group with lines $0, 2, 4, \ldots, 30$. The other groups of the perfect shuffle B network have similar diagrams Note that FIG. 19 is like FIG. 18 with the index in each circle doubled. The perfect shuffle B network is implemented the same way as the perfect shuffle A network with an appropriate relabelling of the lines.

INPUT DATA FLOW

The interface of the host computer is 32-bits wide and has a maximum burst rate of approximately 8 megabytes per second. The clock rate on the path in the input port can be as high as 10 megahertz for a rate up to 40 megabytes per second.

The 32 interface bits of the host feed 72 lines on the input to the perfect shuffle A network 96. Some bits fed more than one line. Let $0 \leq I \leq 3$. Interface bits 8I and $8I + 1$ feed lines 32I and $32I + 1$, respectively. Bit $8I + 2$ feeds lines $32I + 2$ and $32I + 8$. Bit $8I + 3$ feeds lines $32I + 3$ and $32I + 9$. Bit $8I + 4$ feeds lines $32I + 4$ and $32I + 16$. Bit $8I + 5$ feeds lines $32I + 5$ and $32I + 17$. Bit $8I + 6$ feeds lines $32I + 6, 32I + 12, 32I + 18$ and $32I + 24$. Bit $8I + 7$ feeds lines $32I + 7, 32I + 13, 32I + 19$ and $32I + 25$.

The interface data bits flow through the perfect shuffle networks 96,98 and then to the input sub-stager 24. The input sub-stager only stores 32-bits each cycle. The same write-mask generator circuitry that the output sub-stager uses when it reads a main stager with only 8 banks is used. For $0 \leq I \leq 7$, the input sub-stager stores the bits on lines 16I, 16I + 1, 16I + 2, and 16I + 3 of its input interface.

The control input to the perfect shuffles is put into one of six states so the host interface data can be permuted one of six ways. The permutations rearrange the bits within each 8-bit byte of the data. No rearrangement between bytes occurs. Table IV shows the six possible rearrangements of the 8 bits within a typical byte and the perfect shuffle permutations used to accomplish each rearrangement.

PDMU INTERFACE

The interface of the PDMU is 16 bits wide. The clock rate on the interface path in the input port can be as high as 10 megahertz for a rate of 20 megabytes per second and much faster than the interface itself.

The interface path of the PDMU follows the path of the host most of the way. For $0 \leq I \leq 15$, PDMU interface bit I replaces bit 2I in the host interface path. Odd-numbered bits in the host interface path are not used.

The write mask generator in the input sub-stager allows only 16-bits to be stored each cycle. It operates like the write mask generator in the output sub-stager for a 4-bank main stager. For $0 \leq I \leq 3$, lines 32I, 32I+1, 32I+2 and 32I+3 are accessed from the input port.

Two permutations of bits within each PDMU interface byte are possible. Selecting the fourth permutation in perfect shuffle A and the second permutation in perfect shuffle B transfers the bytes with no permutation. Selecting the third permutations in both perfect shuffles permutes the bits within each PDMU interface byte from (01234567) to (02134657).

OUTPUT PORT

As shown in FIG. 17, the outuput port comprises two perfect shuffle networks A and B 106,108, inclusive-OR logic 110, selection logic 112, and two queues 114,116.

The queues 112,114 temporarily hold a number of 128-bit wide columns of data. They are used to synchronize data transmissions with clocks. Columns of data are accepted according to an input clock and transferred out according to an output clock. Their presence allows the data columns to be transmited at a 10 megahertz rate from cabinet to cabinet.

HOST OUTPUT DATA FLOW

Thirty-two of the 128 bits in the main path are transferred to the host interface each cycle. The clock rate can be as high as 10 megahertz for a 40 megabyte/second transfer rate. The flow of output data to the host is almost the exact reverse of the flow of input data described above.

Gating on the input to perfect shuffle B 108 allows only 32 output sub-stager bits to pass through each cycle. Zeros are substituted for the other 96-bits. For $0 \leq I \leq 7$, bits on lines 16I, 16I+1, 16I+2, and 16I+3 are allowed to pass into perfect shuffle B.

The perfect shuffle networks 106,108 are controlled to rearrange the 8-bits within each byte one of six ways. Table V shows the rearrangements along with the perfect shuffle permutations.

The inclusive-OR logic 110 combines the bits on 72 lines to form the 32-bits for the host interface. Let $0 \leq I \leq 3$. Interface line 8I+2 is the inclusive-OR of bits 32I+2 and 32I+8. Interface line 8I+3 is the inclusive-OR of bits 32I+3 and 32I+9. Interface line 8I+4 is the inclusive-OR of bits 32I+4 and 32I+16. Interface line 8I+5 is the inclusive-OR of bits 32I+5 and 32I+17. Interface line 8I+6 is the inclusive-OR of bits 32I+6, 32I+12, 32I+18 and 32I+24. Interface line 8I+7 is the inclusive-OR of bits 32I+7, 32I=13, 32I+19 and 32I+25.

PDMU OUTPUT DATA FLOW

The interface of the PDMU is 16 bits wide. The clock rate in the output port can be as high as 10 megahertz for a rate of 20 megabytes per second, much faster than the interface itself.

The interface path follows the host output interface path through the perfect shuffles and the inclusive-OR logic. The even-numbered bits on the host output are fed to the PDMU interface. For $0 \leq I \leq 15$, PDMU interface line I is fed from line 2I of the host output.

Two permutations of bits within each PDMU interface byte are possible. Selecting the fourth permutation in perfect shuffle B and the second permutation in perfect shuffle A does not rearrange the bits within each byte. Selecting the third permutations in both perfect shuffles rearranges the bits within each PDMU interface byte from (01234567) to (02134657).

CONTROL

Figure 20:
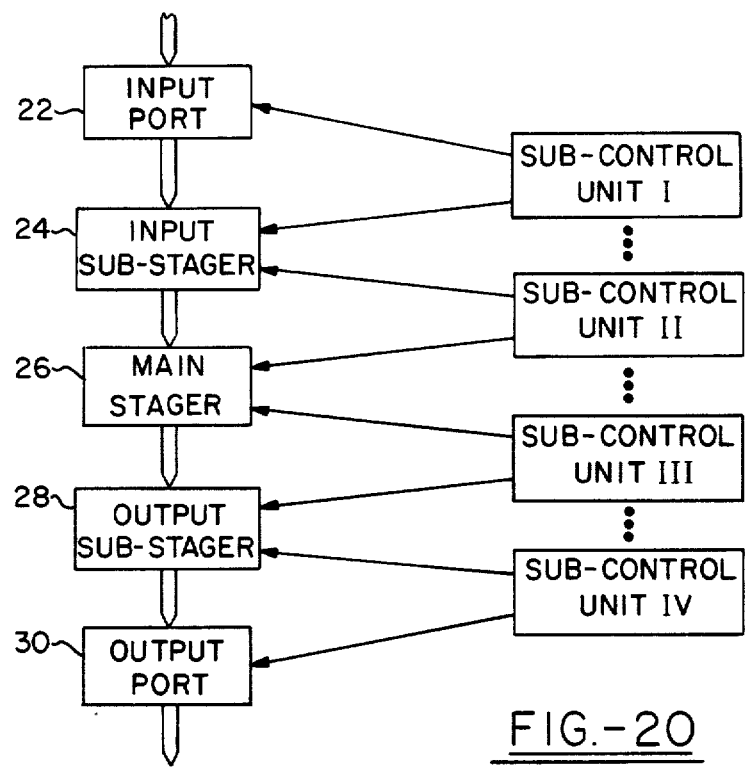
FIG. 20 is a schematic block diagram of the staging memory control.

Control of the staging memory is distributed across four sub-control units as shown in FIG. 20. Sub-cntrol unit I manages the flow of data from the input port 22 to the input sub-stager 24. Every 100 nanoseconds (in synchronism with the movement of a 128-bit wide column of data from the input port to the input sub-stager) sub-control unit I generates the input address parameters and input flip control so the column of data is written into the appropriate places of the input sub-stager.

Sub-control unit II manages the flow of data from the input sub-stager 24 to the main stager 26. Every 100 nanoseconds it fetches a column of data from the input sub-stager and controls the assembly of 16 columns into 32 main stager words which it writes into the main stager.

Sub-control unit III fetches 32 main stager words every 1600 nanoseconds and controls their disassembly into 16 columns which it stores in the output sub-stager 28.

Sub-control unit IV fetches columns of data from the output sub-stager for transmitting to the output port 30.

The distribution of control separates the input port from the output port so one port could be moving data for one array while the other is operating on a totally different array. It also allows double-buffering in the sub-stagers for the smooth flow of data at up to 160 megabytes/second. Another advantage of this control distribution is that it makes the sub-control units almost identical. One design suffices for all four sub-control units.

The dotted lines in FIG. 20 show the synchronization between sub-control units. Units II and III use alternate 800-nanosecond cycles of the main address generator. Units I and II use alternate 50-nanosecond cycles of the input sub-stager. Units III and IV share the output sub-stager similarly.

MAIN STAGER CONTROL LINES

Sub-control units II and III share control of the main stager 26. Sub-control unit II supplies the control to manage the writing of data into the main stager and sub-control unit III supplies the control to manage the reading of data from the main stager. FIG. 3 shows the control lines. Sub-control unit II controls the input permutation network 24 and sub-control unit III controls the output permutation network 30. The two sub-control units share the main address main generator 36 using alternate 800 nanosecond cycles.

21

There are six address parameters fed to the main address generator labelled A, B, , D, E, and F, respectively. Each parameter is 32 bits long and contains a 23-bit field to generate the bank addresses and a 9-bit field to generate the enable bits for the banks; the bits enable writing in the input case and error-checking in the output case. The six address parameters have been described above in more detail. Each parameter is transmitted on a 4-bit-wide bus clocked every 100 nanoseconds. Eight clocks are required to transmit the 32-bit parameter. Each parameter is transmitted serially least-significant end first.

Control of a permutation network 38 as discussed above required: one bit (W) to specify whether $E \equiv 8B$ modulo 32 (W=0) or $E \equiv 8B+16$ modulo 32 (W=1); a 5-bit shift code (x) to specify the amount of the shift in stage 3 of the permutation network; and a 3-bit exponent (y) and a 1-bit exponent (z) to specify the multiplicative factor in stage 2 (the multiplicative factor is equivalent to $(3)^y(-1)^z$ modulo 32). These ten control bits are transmitted on a ten-bit-wide bus to the permutation network.

Sub-control unit III also generates a 1-bit control signal (v) to control the swap circuits on the main stager bank 32. Of the four data bits from each bank being moved at one time, the middle two bits may be swapped or not.

SUB-STAGER CONTROL LINES

Sub-control units I and II share control of the input sub-stager 24 and sub-control units III and IV share control of the output sub-stager 28. The sub-control units use alternate 50 nanosecond sub-stager cycles. Sub-control units I and III use the input cycles of their respective sub-stagers and units II and IV use the output cycles of their respective sub-stagers. FIG. 13 shows the control lines for a sub-stager.

As discussed above with respect to FIGS. 13 and 14, three address parameters P, M, and A feed the sub-stager address generator. Parameter P is the 3-bit page address, parameter M is the 7-bit access mode, and parameter A is the 7-bit local address. The three address parameters are transmitted in parallel on a 17-bit-wide bus.

The flip network 86 is controlled by a 7-bit flip control parameter, F. It is transmitted on a 7-bit-wide bus. Each sub-stager has a write-mask generator. The output sub-stager uses it when the main stager has less than 32 banks. The input sub-stager uses it when the input port is reading host data or PDMU data. A 6-bit-wide bus controls the write-mask generator.

INPUT AND OUTPUT PORT CONTROL LINES

Each port 22,30 has two perfect shuffle networks 96,98,106,108 requiring control, as shown in FIGS. 16 and 17. Each perfect shuffle network requires a 2-bit control parameter to select one of its four permutations. Four control bits control the two networks of the input port and another four control the two networks of the output port. These bits are transmitted over four-bit-wide busses.

Each port also has control bits to select the various data paths in the port. Sub-stager data can be steered to or from 3 places (ARU, host, or PDMU) and the path to or from the external interfaces can be enabled or not. Three control bits select the paths.

22

TRANSFER COUNTERS

Each sub-control unit has a counter to count the transfers of columns of data. The counter is used to generte address parameters for the sub-stager and/or main stager. To simplify the generation of address parameters for any size or shape array the transfer counter is prorammable.

For example, when moving a LANDSAT-C image each column of data may contain 4 pixels with 4 bands per pixel and 8 bits per band. One image line contains 3240 pixels and requires 810 columns. The image contains 2340 lines. In this case, the transfer counter should be divided into two sub-counters. One sub-counter counts columns and has 810 states; it keeps track of which pixels of a line are being moved. The other sub-counter has 2340 states and keeps track of the line number; it is bumped (incremented or decremented) whenever the first sub-counter counts through all 810 of its stages.

Another example may be the mosaicking of a LANDSAT-C image from sub-arrays in the ARU. Each sub-array is 117 lines × 120 pixels so the mosaic is 20×27 sub-arrays. To read the data from the ARU requires five sub-counters. The first sub-counter counts pixels in a sub-array and has 120 states; it is bumped for each ARU column moved. The second sub-counter counts bits of a pixel and has 8 states; it is bumped for each ARU bit-plane (once for each overflow of the first sub-counter). The third sub-counter counts spectral bands and has 4 states; it is bumped for each overflow of the second sub-counter. The fourth sub-counter has 27 states and counts the sub-arrays across the image; it is bumped for each overflow of the third sub-counter. The fifth sub-counter has 20 states and is bumped once for each overflow of the fourth sub-counter.

These examples illustrate the need for a programmable transfer counter; a counter that can be sliced arbitrarily into sub-counters with an arbitrary number of states in each sub-counter.

Each sub-control unit has a 24-bit transfer counter that can be sliced arbitrarily into sub-counters. If a sub-counter has N states, then it uses m bits where $2^{m-1} < N \leq 2^m$. An N-state counter will decrement from an initial state of $N-1$ toward 0. Every time it reaches 0 it is re-initialized to $N-1$ and the next sub-counter is decremented.

Figure 21:
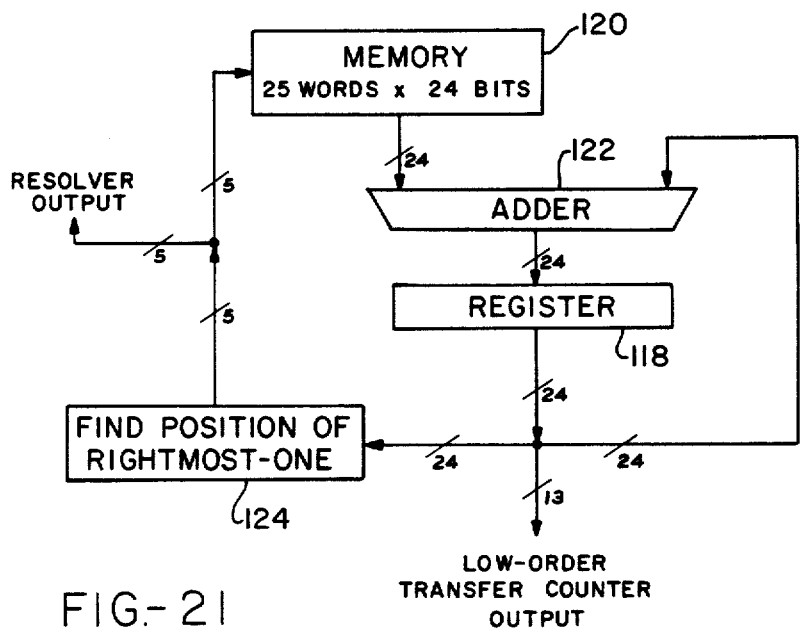
FIG. 21 is a block diagram of a transfer counter.

A transfer counter has the block diagram of FIG. 21. A 24-bit register 118 holds the states of all sub-counters. For each column of data being transferred by the sub-control unit an addend from the memory 120 is added to the register via the adder 120. The addend is selected depending on the position of the right-most one in the register as determined at 124. If all register bits equal 0, then a 25th addend is selected.

The transfer counter is programmed by loading the memory 120 with the appropriate addends. Number the sub-counters with 0 being the number of the fastest-changing counter. Let sub-counter i have $N_i$ states and let $m_i$ be the least integer such that $2^{m_i} \geq N_i$. The transfer counter register positions are numbered from right to left with 0 as the right-most position and 23 as the left-most position. Sub-counter i will occupy positions $p_i$ through $p_i + m_i - 1$ where $p_o = 0$ and $$p_i = \sum_{j=0}^{i-1} m_j \text{ for } i > 0.$$

If the right-most one in the register is in position k, then addend k is selected from memory. If all register bits are 0, then addend 24 is selected.

Addends 0 through $m_o-1$ each equal $-1$. For $i>0$ addends $p_i$ through $p_i=m_i-1$ each equal:

$$-2^{p_i} + \sum_{j=0}^{i-1} 2^{p_j}(N_j - 1)$$

Addend 24 equals:

$$\sum_{i=0} 2^{p_i}(N_i - 1)$$

If the register reaches the all-zero state then addend 24 is added to it. This sets each sub-counter i to the $N_i$-1 state.

As long as sub-counter 0 is not in the zero state, the position of the right-most one in the register is less than $m_o$. Addends equal to $-1$ are added to the register decrementing sub-counter 0 and leaving the other sub-counters alone.

Whenever sub-counter 0 reaches the zero state and sub-counter 1 is not in the 0 state then the position of the right-most one in the register is from $p_1$ through $p_1+m_1-1$. An addend equal to $-2^{p_1}+N_0-1$ is added to the register putting sub-counter 0 back into the $N_0-1$ state and subtracting 1 from sub-counter 1.

In general, if sub-counters 0 through i-1 are all in their zero states and sub-counter i is not in its zero-state, the position of the right-most one in the regster is from $p_i$ through $p_i+m_i-1$. An addend equal to $$-2^{p_i} + \sum_{j=0}^{i-1} 2^{p_j}(N_j - 1)$$

is added to the register decrementing sub-counter i by 1 and putting $N_j-1$ into sub-counter j for all $j<i$. Thus, sub-counter 0 counts transfers through its $N_0$ states. Sub-counter 1 counts each time sub-counter 0 reaches zero and counts through $N_1$ states, etc.

SUB-STAGER CONTROL

Each sub-control unit feeds a sub-stager with address parameters and flip control bits. Units I and III also feed write-mask control bits. The 7-bit access mode parameter, M, is a constant while a given file of data is being moved. It comes from a 7-bit register in the sub-control unit which is initialized when a file is opened. The other control lines are dynamic while a file is being moved. They are derived from the low-order (fastest changing) 13 bits of the transfer counter as just discussed above.

Figure 22:
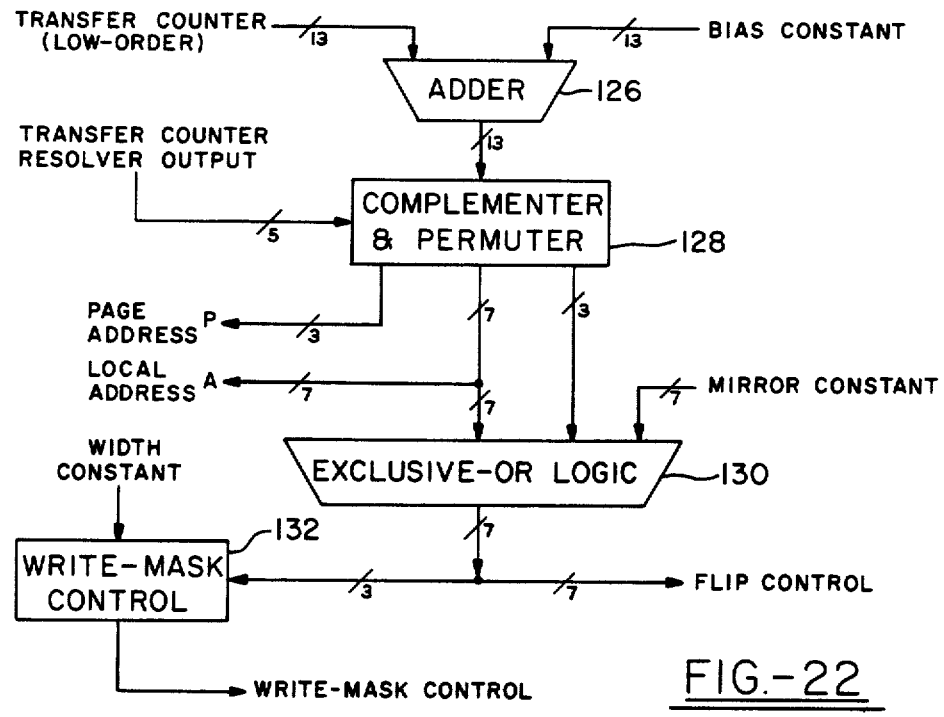
FIG. 22 is a block diagram of a sub-stager control circuit.

As shown in FIG. 22, a 13-bit bias constant is first added to the low-order transfer counter bits in adder 126. Then some of the bits in the 13-bit sum are complemented and the sum is permuted one of (13!) ways at 128. As discussed above, three of the permuted bits form the page address, (P). Another seven of the permuted bits form the local address,(A). The remaining three permuted bits form the repetition index, (T). The local address (A), the repetition index (T), and a 7-bit mirror constant are combined with exclusive-OR logic 130 to form the 7-bit flip control. Three of the flip control bits are used to generate the write-mask control 132 in sub-control units I and III.

BIAS ADDITION

The bias constant adds to the transfer counter bits. As described earlier, every sub-counter i of the transfer counter is a decrementing counter that counts down from $N_i-1$ to zero. In some cases, it may be desired to add a bias, $B_i$, to the sub-counter state so it counts down from $N_i-1+B_i$ to $B_i$. The bias constant adds the appropriate biases to every sub-counter in the low-order bits of the transfer counter before they are used to form the sub-stager control bits.

An example where a bias is required is shown in FIG. 12. Each main stager word holds one bit of 64 successive pixels in one image line. A 128-line x 128-pixel bit-plane is fed to the ARU 14. In general, the bit-plane may not start on a word boundary so the 128 pixels in one line are found in three different main stager words. The output sub-stager reads a 128-line×192-pixel bit-plane from the main stager. Each pixel has an 8-bit sub-stager address running from 0 to 191. To send the bit-plane to the ARU it is necessary to create 128 pixel addresses starting at some point 127+p and counting from 127 down to 0 and add p using the bias constant.

COMPLEMENTATION

Selected bits of the 13-bit biased transfer counter state may be complemented. This is useful for reversing the order in which data bits are accessed. For instance, in the example directly above, the 8-bit pixel can be complemented so instead of accessing pixels in decreasing order, access will be made in increasing order. This will have the effect of inverting the ARU bit-plane east to west. Implementation of the complementation operation will be discussed later.

PERMUTATION

Depending on the layout of sub-arrays in sub-stager storage, it may be desired that the page address change fastest, the local address change fastest, or the repetition index change fastest. In the transfer counter the lowest-order bit changes fastest, followed by its neighbor, etc. Permuting allows the steering of each of the 13 low-order transfer counter bits to the appropriate place. Any of the 6,227,020,800 (13!) permutations are possible. Implementation of the permutation operation will be discussed below.

FLIP CONTROL GENERATION

As described above, the flip control bits are the bits of the local address A modified by the repetition index T. For $0\le i \le 6$, let $f_i$ be a flip-control bit and $a_i$ be a local address bit. For $0\le i \le 2$, let $t_i$ be a repetition-index bit. Then, $f_i=a_i$ for i=0,a,5,6; and $f_i=a_i\oplus t_{i-2}$ for i=2,3,4. Sub-stager control also modifies the flip-control bits with a 4-bit mirror constant. The mirror-constant bits are labeled $q_6$, $q_5$, $q_1$ and $q_0$, respectively. The following logic is performed: $f_i=a_i\oplus q_i$ for i=0,1,5,6; and $f_i=a_i\oplus t_{i-2}$ for i=2,3,4. Note that the bits of the repetition index can be complemented if desired, as earlier discussed, so any or all of the flip-control bits can be complemented if desired.

If all flip-control bits are complemented the sub-stager flip network inverts the 128-bit data column end-for-end as though it was being seen in mirror.

If the data column goes to the ARU it is inverted north to south. Thus, an ARU bit-plane can be inverted north to south by the mirror operation and/or inverted east to west by complementing the access order.

Complementing some of the flip control bits makes the flip network do other useful permutations. Assume a 128-bit data column with 16 eight-bit bytes. Complementing $f_2$, $f_1$, and $f_0$ has the effect of inverting the order of bits within each byte, leaving the byte order fixed. Complementing $f_6$, $f_5$, $f_4$, and $f_3$ has the effect of inverting the order of bytes within the column, leaving the bit order within bytes fixed.

WRITE-MASK CONTROL

The output sub-stager has a write-mask generator 94 to handle the case where the main stager has less than 32 banks. The input sub-stager also has a write-mask generator to handle the host or PDMU data. The mask generators are identical and controlled by identical circuitry in sub-control units I and III.

Flip control bits $f_2$, $f_3$, and $f_4$ are used to control the masks. Also, there is a width constant to specify the width of the data columns being written into the sub-stager. In the output sub-stager (sub-control unit III), the width is 4N where N is the number of main stager banks; the width is 16,32,64 or 128 bits. In the input sub-stager (sub-control unit I) the width is 16 bits for PDMU data, 32 bits for host data or 128 bits for ARU data.

As discussed earlier, there are eight write-mask lines. For $0 \leq U = u_0 + 2u_1 + 4u_2 \leq 7$, write-mask line U enables writing to 16 sub-stager banks, namely banks $32I + 4U + J$ for $0 \leq I \leq 3$ and $0 \leq J \leq 3$.

If the width is 128 bits, all eight mask lines are enabled continually. If the width is 64 bits, then the even-numbered mask lines are enabled when $f_2 = 0$ and the odd-numbered mask lines are enabled when $f_2 = 1$. If the width is 32 bits then mask lines $2f_3 + f_2$ and $4 + 2f_3 + f_2$ are enabled. If the width is 16 bits then mask line $4f_4 + 2f_3 + f_2$ is enabled.

COMPLEMENTER AND PERMUTER

Earlier, the complementation and permutation operations were discussed. Because there are 6,227,020,800 permutations of 13 bits, an economical means of selecting any permutation is needed. Since this circuitry will also selectively complement any or all 13 bits, the complementation operation is included as well.

Figure 23:
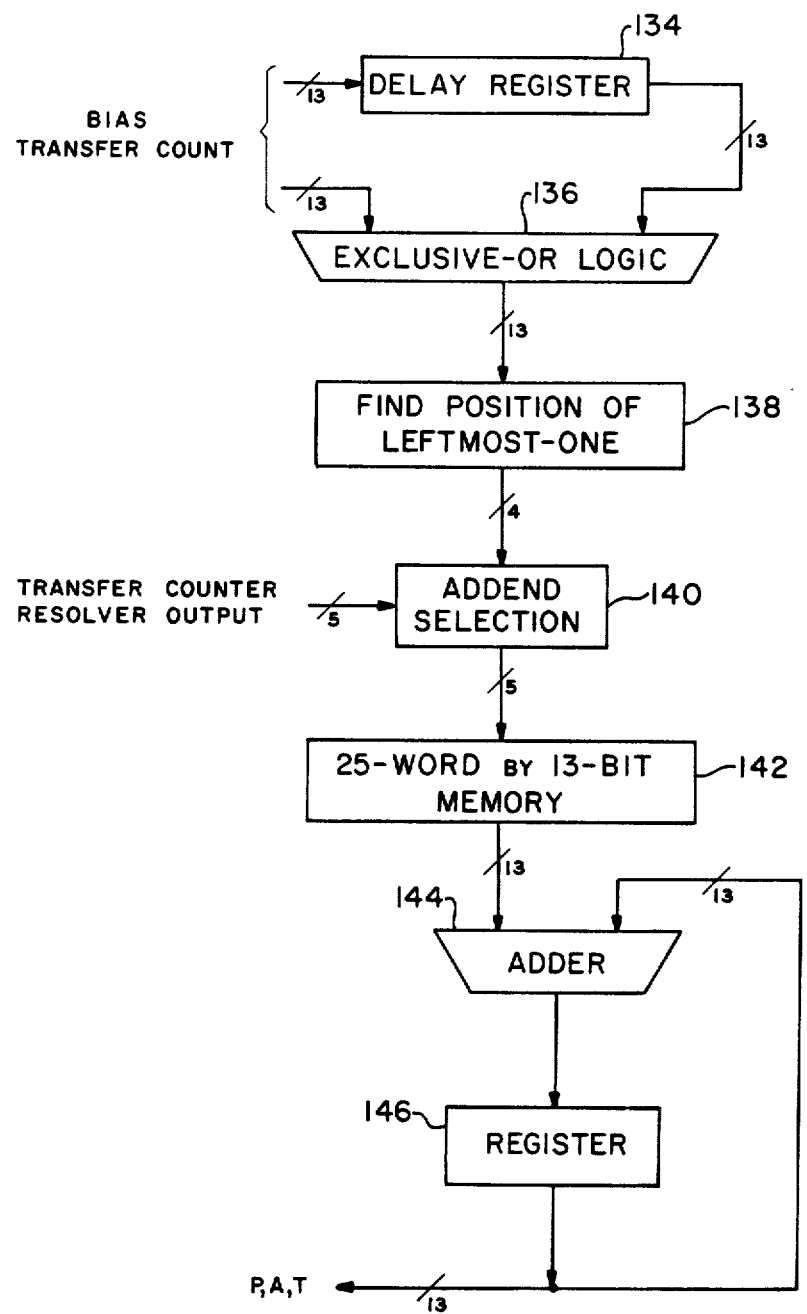
FIG. 23 is a schematic block diagram of a complementer and permuter.

The complementer and permuter 128 receives the 13-bit biased transfer count from the sub-stager control adder 126 as shown in FIG. 22. As shown in FIG. 23, the biased transfer count feeds a delay register 134 and one set of inputs to 13 exclusive-OR gates 136 along with the output of the delay register. This has the effect of comparing the current count with the previous count and marking where bits are changed: an exclusive-OR output line will equal 1 if, and only if, the corresponding bit in the biased transfer count has changed between the previous and current counts.

A resolver finds the position of the left-most one in the exclusive-OR outputs as at 138. This is also the position of the left-most change in the biased transfer count. Let k be the position of the left-most change. It is within some sub-stager. Since sub-counter i changes only if all lower-order sub-counters are being re-initialized, the changes can be determined in the lower-order sub-counters. Since k is the left-most change, no higher order sub-counter is changing so sub-counter i is being decremented. This means that bit k is changing from 1 to 0 and all lower-order bits in sub-counter i are changing from 0 to 1. Thus, knowing k advises exactly what changes are occurring in the biased transfer count.

The analysis in the previous paragraph assumed that no high-order sub-counter in the 24-bit transfer count was changing, only sub-counters within the lower-order 13 bits. If a high-order sub-counter is changing, all sub-counters in the low-order 13 bits are being re-initialized. It can be determined when this occurs from the resolver output of the 24-bit transfer counter 124 of FIG. 21. If the resolver output is 13 or more, a high-order sub-counter is changing, otherwise just low-order sub-counters are changing. Note that the resolver output with a one-cycle delay is considered because it is determining the next change in the transfer counter.

The addend selection circuit 140 of FIG. 23 selects the transfer counter resolver output if it is 13 or more, otherwise it selects the position of the left-most change in the biased transfer count. Its output is used to address a memory 142 of addends.

Permutations are programmed by loading the memory with permuted addends. The permuted addends are added at 144 to a 13-bit register 146 which holds the permuted biased transfer count. Complementations are programmed by modifying appropriate bits of certain addends.

MAIN-STAGER CONTROL

Sub-control units II and III control the main stager as well as a sub-stager. Main-address parameter A is dynamic, while B through F are static, while a given array of data is being moved in or out of the stager. Parameters B through F are stored in a memory in the sub-control unit arranged so that they can be transmitted to the main-address generator, 4 bits each clock cycle for 8 cycles.

The permutation networks in the main stager are controlled by w, x, y, and z. Control bit w depends on whether $E \equiv 8B$ modulo 32 or $E \equiv 8B + 16$ modulo 32. Since B and E are static, w is also static. Control signal x is equal to the right-most 5 bits of address parameter A and is dynamic. Control signals y and z are related to B and are static.

The swap circuits in the main stager banks are controlled by a static signal, v. Thus, only A and x are dynamic. All other signals can be generated from static registers and memories loaded before a given array is moved.

Figure 24:
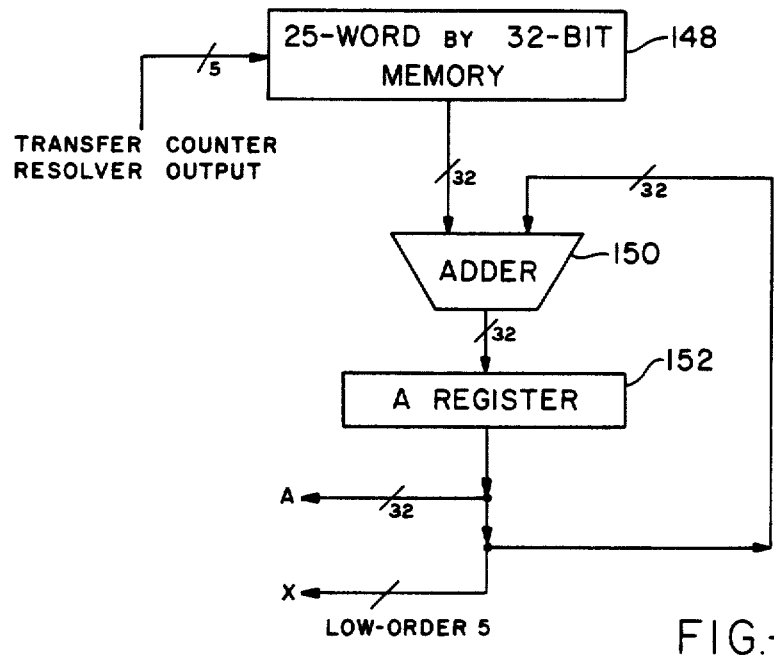
FIG. 24 is a block diagram of a main stager control circuit.

Parameters A and x are derived from the resolver output of the transfer counter of FIG. 21. The resolver output selects an addend in a 25-word by 32-bit memory 148 as shown in FIG. 24. The 32-bit addend is added as at 150 to a 32-bit register 152 holding address parameter A. Parameter x is simply the low-order 5 bits of A.

Main stager control is programmed by loading the memory with appropriate addends. The transfer counter comprises a number of sub-counters. Sub-counter i has $N_i$ states and counts from $N_i - 1$ to 0. Let $S_i$ be the state of sub-counter at some time. Parameter A is a linear combination of the sub-counter states plus a base address:

$$A = \text{BASE} + \sum_{i=0} T_i \cdot S_i$$

where BASE is the base address of the array in the main stager and $T_i$ is the coefficient for the state of sub-counter i.

Note that there are 16 sub-stager cycles for each main stager cycle. A main stager word is split into 16 four-bit sections and moved a section at a time in or out of the sub-stager. The transfer counter counts sub-stager cycles. The lowest-order sub-counter (sub-counter 0) has 16 states ($N_0=16$) so that it counts through the sub-stager cycles for each main stager. Sub-counter 1 is determined once for each main stager cycle. The coefficient of $S_0$ is zero ($T_0=0$).

Note that each resolver state selects an addend for the transfer counter, FIG. 21, and an addend for parameter A, FIG. 24. The addend for the transfer counter changes the sub-counter states in a predictble way and using the equation for A, one can predict the corresponding change in A. These changes are stored in this memory of main stager control.

INPUT AND OUTPUT PORT CONTROL

The path selection and perfect shuffle control lines for the input and output ports are all static for a given array transfer. They come from static registers loaded when an array transfer starts.

Thus it can be seen that the objects of the invention have been satisfied by the structure and technique presented hereinbove. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be had to the appended claims.

TABLE I
POWERS OF 3 MODULO 32 AND THEIR NEGATIVES

| y | $(3^y)$MODULO 32 | $-(3^y)$MODULO 32 |
|---|---|---|
| 0 | 1 | 31 |
| 1 | 3 | 29 |
| 2 | 9 | 23 |
| 3 | 27 | 5 |
| 4 | 17 | 15 |
| 5 | 19 | 13 |
| 6 | 25 | 7 |
| 7 | 11 | 21 |

TABLE II

| DATA BIT | ECC CODE ($C_0$ to $C_7$) | DATA BIT | ECC CODE ($C_0$ to $C_7$) |
|---|---|---|---|
| 0 | - - - - - XXX | 32 | X - - - XXXX |
| 1 | - - - - X- XX | 33 | X - - - - - XX |
| 2 | - - - - XX- X | 34 | X - - - - X- X |
| 3 | - - - - XXX- | 35 | X - - - - XX- |
| 4 | - - - XXXXX | 36 | X - - X- XXX |
| 5 | - - - X- - XX | 37 | X - - XX- XX |
| 6 | - - - X- X- X | 38 | X - - XXX- X |
| 7 | - - - X- XX- | 39 | X - - XXXX- |
| 8 | - - X- XXXX | 40 | X- X- - XXX |
| 9 | - - X- - - XX | 41 | X- X- X- XX |
| 10 | - - X- - X- X | 42 | X- X- XX- X |
| 11 | - - X- - XX- | 43 | X- X- XXX- |
| 12 | - - XX- XXX | 44 | X- XXXXXX |
| 13 | - - XXX- XX | 45 | X- XX- - XX |
| 14 | - - XXXX- X | 46 | X- XX- X- X |
| 15 | - - XXXXX- | 47 | X- XX- XX- |
| 16 | - X- - XXXX | 48 | XX- - - XXX |
| 17 | - X- - - - XX | 49 | XX- - X- XX |
| 18 | - X- - - X- X | 50 | XX- - XX- X |
| 19 | - X- - - XX- | 51 | XX- - XXX- |
| 20 | - X- X- XXX | 52 | XX- XXXXX |
| 21 | - X- XX- XX | 53 | XX- X- - XX |
| 22 | - X- XXX- X | 54 | XX- X- X- X |
| 23 | - X- XXXX- | 55 | XX- X- XX- |
| 24 | - XX- - XXX | 56 | XXX- XXXX |
| 25 | - XX- X- XX | 57 | XXX- - - XX |
| 26 | - XX- XX- X | 58 | XXX- - X- X |
| 27 | - XX- XXX- | 59 | XXX- - XX- |
| 28 | - XXXXXXX | 60 | XXXX- XXX |
| 29 | - XXX- - XX | 61 | XXXXX- XX |
| 30 | - XXX- X- X | 62 | XXXXXX- X |
| 31 | - XXX- XX- | 63 | XXXXXXX- |

TABLE III
CERTAIN SUB-STAGER ACCESS MODES

| Access Mode (M) Decimal | Binary | Selected Rows | Selected Columns |
|---|---|---|---|
| 0 | 0000000 | All rows | One column |
| 1 | 0000001 | Every other row | 2 adjacent columns |
| 3 | 0000011 | Every 4th row | 4 adjacent columns |
| 7 | 0000111 | Every 8th row | 8 adjacent columns |
| 15 | 0001111 | Every 16th row | 16 adjacent columns |
| 31 | 0011111 | Every 32nd row | 32 adjacent columns |
| 63 | 0111111 | Every 64th row | 64 adjacent columns |
| 127 | 1111111 | One row | All columns |
| 126 | 1111110 | 2 adjacent rows | Every other column |
| 124 | 1111100 | 4 adjacent rows | Every 8th column |
| 120 | 1111000 | 8 adjacent rows | Every 8th column |
| 112 | 1110000 | 16 adjacent rows | Every 16th column |
| 96 | 1100000 | 32 adjacent rows | Every 32nd column |
| 64 | 1000000 | 64 adjacent rows | Every 64th column |

TABLE IV
REARRANGEMENT OF BITS WITHIN A HOST INTERFACE INPUT BYTE

| PERMUTATION IN PERFECT SHUFFLE | | OUTPUT BIT | | | | | | | |
|---|---|---|---|---|---|---|---|---|---|
| A | B | 0 | 1 | 2 | 3 | 4 | 5 | 6 | 7 |
| FIRST | FIRST | 0 | 1 | 2 | 3 | 4 | 5 | 6 | 7 |
| FIRST | SECOND | 0 | 1 | 4 | 5 | 2 | 3 | 6 | 7 |
| THIRD | FOURTH | 0 | 4 | 1 | 5 | 2 | 6 | 3 | 7 |
| SECOND | FIRST | 0 | 2 | 1 | 3 | 4 | 6 | 5 | 7 |
| FOURTH | SECOND | 0 | 2 | 4 | 6 | 1 | 3 | 5 | 7 |
| THIRD | THIRD | 0 | 4 | 2 | 6 | 1 | 5 | 3 | 7 |

TABLE V
REARRANGEMENT OF BITS WITHIN A HOST INTERFACE OUTPUT BYTE

| PERMUTATION PERFECT SHUFFLE | | OUTPUT BIT | | | | | | | |
|---|---|---|---|---|---|---|---|---|---|
| B | A | 0 | 1 | 2 | 3 | 4 | 5 | 6 | 7 |
| FIRST | FIRST | 0 | 1 | 2 | 3 | 4 | 5 | 6 | 7 |
| FOURTH | FIRST | 0 | 1 | 4 | 5 | 2 | 3 | 6 | 7 |
| FOURTH | SECOND | 0 | 4 | 1 | 5 | 2 | 6 | 3 | 7 |
| FIRST | FOURTH | 0 | 2 | 1 | 3 | 4 | 6 | 5 | 7 |
| SECOND | THIRD | 0 | 2 | 4 | 6 | 1 | 3 | 5 | 7 |
| THIRD | THIRD | 0 | 4 | 2 | 6 | 1 | 5 | 3 | 7 |

What is claimed is:

1. A computer organization, comprising:
   a host computer;
   a program and data management unit;
   a processing array unit;
   an array control unit interconnected among said host computer, program and data management unit, and processing array unit; and a staging memory interconnected between said host computer, program and data management unit, and processing array unit, said staging memory comprising:

input means connected to said host computer, program and data management unit, and said processing array unit for receiving data therefrom;

output means connected to said host computer, program and data management unit, and said processing array unit for passing data thereto; and a main stager interposed between said input and output means for receiving and maintaining large volumes of data therein, said main stager including a plurality of memory banks for receiving and maintaining data, said banks receiving and transferring data in parallel, said memory banks being connected in parallel to addressing means for accessing storage locations in said memory banks and wherein a memory bank L stores words whose addresses are congruent to L modulo the number of memory banks.

2. The computer organization according to claim 1 wherein said plurality of memory banks is a number evenly divisible by four.

3. The computer organization according to claim 1 wherein said addressing means includes a code generating means for mutually exclusively accessing a word in each of said memory banks.

4. The computer organization according to claim 3 wherein said main stager further includes an input permutation network and an output permutation network respectively connected to said input and said output means, said input permutation network routing input data words to the memory banks containing a corresponding word address, and said output permutation network routing output data words from said memory banks to said output means.

5. The computer organization according to claim 4 wherein said input means includes an input port for shuffling input data prior to passage of said data to said input permutation network.

6. The computer organization according to claim 5 wherein said output means includes an output port for shuffling output data prior to passage of said data to said output permutation network.

* * * * *